United States Patent
Pickett et al.

(10) Patent No.: US 12,322,220 B2
(45) Date of Patent: Jun. 3, 2025

(54) METHODS, APPARATUS, AND ARTICLES OF MANUFACTURE TO OBTAIN DIAGNOSTIC INFORMATION FOR A SYSTEM

(71) Applicant: Deere & Company, Moline, IL (US)

(72) Inventors: Terence D. Pickett, Waukee, IA (US); Brandon M. McDonald, Johnston, IA (US); Timothy A. Wilcox, Cissna Park, IL (US)

(73) Assignee: Deere & Company, Moline, IL (US)

( * ) Notice: Subject to any disclaimer, the term of this patent is extended or adjusted under 35 U.S.C. 154(b) by 392 days.

(21) Appl. No.: 17/700,201

(22) Filed: Mar. 21, 2022

(65) Prior Publication Data

US 2023/0298394 A1    Sep. 21, 2023

(51) Int. Cl.
| | |
|---|---|
| *G07C 5/00* | (2006.01) |
| *G06F 18/214* | (2023.01) |
| *G06N 20/00* | (2019.01) |
| *G07C 5/08* | (2006.01) |

(52) U.S. Cl.
CPC ........... *G07C 5/008* (2013.01); *G06F 18/214* (2023.01); *G06N 20/00* (2019.01); *G07C 5/0816* (2013.01)

(58) Field of Classification Search
CPC ...... G07C 5/008; G07C 5/0816; G06N 20/00; G06F 18/214
See application file for complete search history.

(56) References Cited

U.S. PATENT DOCUMENTS

| | | |
|---|---|---|
| 2005/0251304 A1 | 11/2005 | Cancellara et al. |
| 2014/0316639 A1 | 10/2014 | Braswell |
| 2015/0309855 A1* | 10/2015 | Agnihotram .......... G06F 11/079 714/37 |
| 2018/0197354 A1 | 7/2018 | Remboski et al. |
| 2019/0109988 A1* | 4/2019 | Lin ....................... H04N 23/811 |
| 2019/0114387 A1* | 4/2019 | Wolfe ........................ B64F 5/40 |
| 2020/0294333 A1* | 9/2020 | Aiello .................. G07C 5/0808 |
| 2020/0394850 A1* | 12/2020 | Sankavaram .......... G07C 5/008 |

(Continued)

FOREIGN PATENT DOCUMENTS

DE    102009053753 B4    3/2017

OTHER PUBLICATIONS

Extended European Search Report and Written Opinion issued in European Patent Application No. 23159703.0, dated Aug. 28, 2023, in 09 pages.

*Primary Examiner* — Scott A Browne
*Assistant Examiner* — Terry C Buse
(74) *Attorney, Agent, or Firm* — Hanley, Flight & Zimmerman, LLC

(57) ABSTRACT

Methods, apparatus, systems, and articles of manufacture to obtain diagnostic information for a system are disclosed. An example apparatus includes vehicle interface circuitry to obtain information corresponding to a detected problem of a vehicle, cloud interface circuitry to obtain, via a network communication, an output of a machine learning model executed based on the information, the output to indicate (a) a component associated with the detected problem, and (b) a probability associated with the component, instruction generation circuitry to generate instructions for performing a test on the component, and user interface control circuitry to cause the instructions to be displayed on a mobile device.

21 Claims, 12 Drawing Sheets

(56) References Cited

U.S. PATENT DOCUMENTS

2021/0276590 A1* 9/2021 McGee ............. B60W 60/0025
2023/0282033 A1* 9/2023 Duan ..................... G07C 5/006
                                                        701/29.6

* cited by examiner

METHODS, APPARATUS, AND ARTICLES OF MANUFACTURE TO OBTAIN DIAGNOSTIC INFORMATION FOR A SYSTEM

FIELD OF THE DISCLOSURE

This disclosure relates generally to diagnostics and, more particularly, to methods, apparatus, and articles of manufacture to obtain diagnostic information for a system.

BACKGROUND

Agricultural machines typically include an electronic system to control and monitor performance of one or more components of the agricultural machines. The one or more components can include mechanical devices (e.g., a sprayer, a planter, an actuator, etc.) and/or electronic components (e.g., a sensor, a controller, a battery, etc.) that enable the machine to perform an agricultural task. In some cases, failure and/or malfunction of the components and/or connectors (e.g., wires) therebetween can disrupt a functionality of the machine. In some such cases, the electronic system can identify locations of the components and/or connectors to be repaired.

Figure 1:
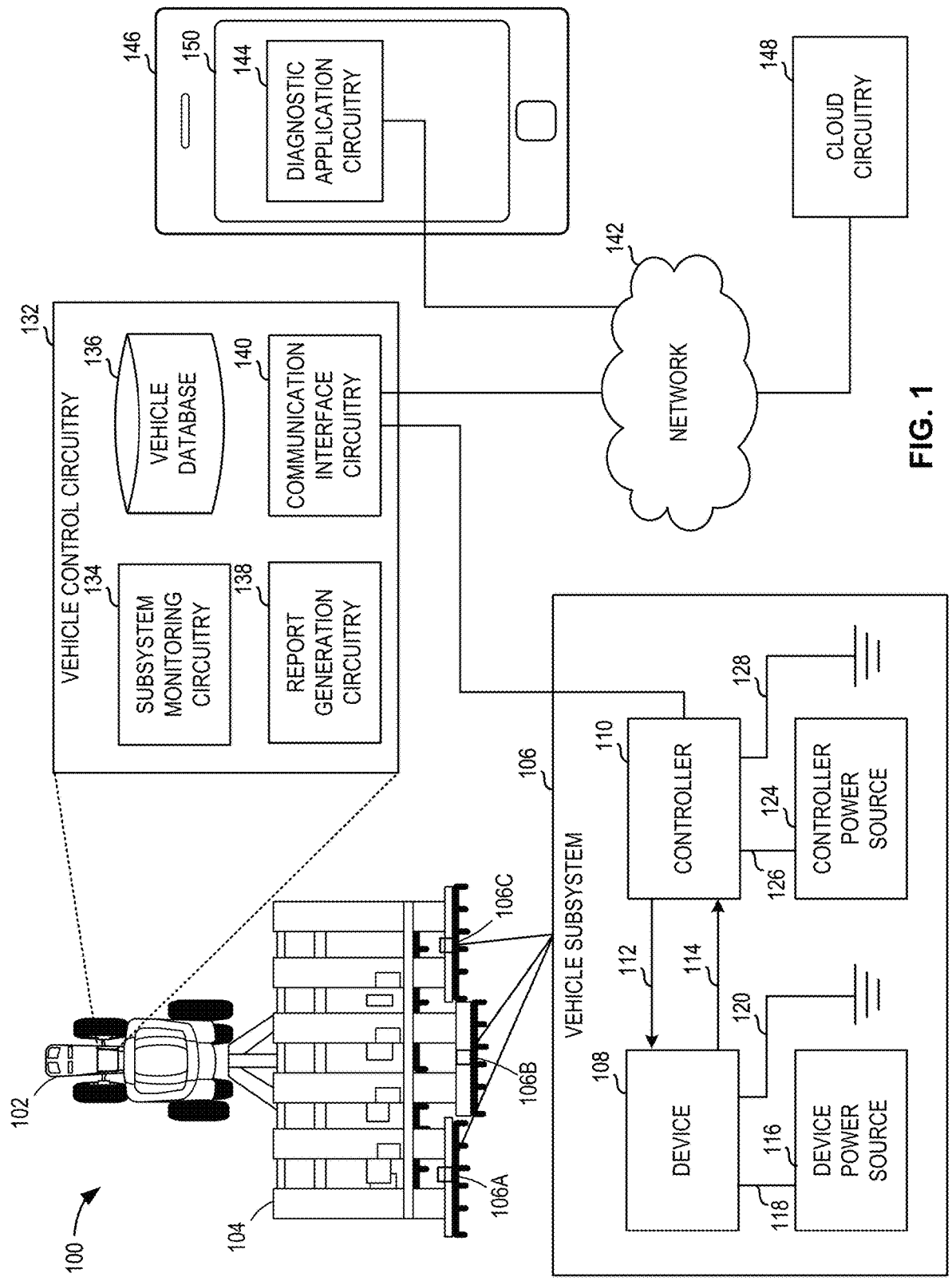
FIG. 1 is a schematic illustration of an example environment in which teachings of this disclosure may be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Vehicles (e.g., agricultural vehicles, agricultural machines) typically include electronic systems to control and/or monitor performance of one or more components implemented on the vehicle. For example, the components can include mechanical devices, such as sprayers, planters, actuators, etc., that may be used to perform one or more agricultural tasks. Additionally or alternatively, the components can include electronic devices such as sensors, batteries, and/or controllers. In some examples, the components are operatively, electrically, and/or communicatively coupled to one another via connectors (e.g., wires, harnesses, wireless signals, etc.) to enable transfer of information, control signals, and/or power therebetween.

In some examples, one or more of the components can be communicatively coupled to a control system (e.g., a centralized control system) on-board the vehicle to send diagnostic information thereto. In some examples, the control system monitors the diagnostic information to evaluate performance of the components (e.g., spraying rate of the sprayers, planting rate of the planters, etc.) and/or determine whether inspection and/or repair of the components is required. For example, the control system can detect a problem with the electronic system based on the diagnostic information. Such problems can include, for example, intermittent response of one or more components, loss of signal and/or irregular signal from the one or more components, performance of the one or more components not satisfying a threshold, etc. In some examples, the control system includes an operator interface (e.g., a display screen) in a cab of the vehicle to display the diagnostic information and/or provide instructions to an operator of the vehicle based on the detected problem.

In some examples, in response to the control system detecting a problem with the electronic system, the operator is directed to perform additional testing and/or inspection to identify a particular source of the problem (e.g., identify the component(s) and/or connector(s) causing the problem). In such examples, the control system can provide, via the operator interface, instructions on how to locate, test, and/or repair one or more of the components of the electronic system. However, when there are multiple possible sources of the detected problem, it may be difficult for the control system and/or the operator to determine the location and/or type of testing to be performed. Furthermore, the components may be distributed across large areas of the machine and/or far from the cab of the vehicle, thus making it difficult for the operator to locate the components to be inspected and/or repaired when instructions are provided at the cab of the vehicle. Additionally, the components may not be easily accessible to the operator when the components are located underneath and/or in between one or more other vehicle parts. As such, the operator may require additional instructions and/or guidance on how to access the components to be inspected.

Examples disclosed herein enable diagnostic information to be obtained and/or displayed via example processor circuitry implemented on a mobile device. In some examples, the processor circuitry of the mobile device is communicatively coupled to the control system of the vehicle. In response to the control system detecting a problem with one or more components of the vehicle, the processor circuitry provides the diagnostic information to a cloud-based system in which one or more machine learning models are executed based on the diagnostic information. In some examples, the machine learning models are trained, based on historical data, to output probable sources of the detected problem and/or testing instructions based on the detected problem. For example, the historical data represents known solutions to previously detected problems having known parameters (e.g., a type, model, and/or age of an affected component, a location of the detected problem, etc.).

In some examples, the processor circuitry of the mobile device obtains the output from the executed machine learning model(s) and displays the probable sources and/or testing instructions on a user interface of the mobile device. Furthermore, the processor circuitry can cause the user interface to display a map (e.g., an interactive map) of the electronic system, where the map indicates locations of components of the vehicle. In some examples, via the user interface, the operator can select and/or enlarge portions of the map for guidance in locating the components to be inspected and/or tested. By providing instructions via a mobile device, examples disclosed herein improve efficiency of accessing and/or testing components that are distributed across the vehicle and/or located far from the cab of the vehicle. Furthermore, examples disclosed herein generate instructions using one or more machine learning models trained based on historical data, thus improving accuracy of selecting the appropriate components to be tested and/or repaired.

FIG. 1 is a schematic illustration of an example environment 100 in which teachings of this disclosure may be implemented. In the illustrated example of FIG. 1, the environment 100 includes an example vehicle 102 and an example implement 104 operatively coupled thereto. In this example, the example vehicle 102 is an agricultural vehicle (e.g., a tractor, front loader, harvester, cultivator, etc.). However, the vehicle 102 can be any other suitable vehicle, machine, and/or product that includes an electronic system to operate such as, for example, a mower, lawn equipment, etc. In this example, the implement 104 includes one or more example subsystems (e.g., vehicle subsystems) 106A, 106B, 106C configured to perform one or more agricultural tasks. For example, the agricultural tasks can include at least one of spraying, planting, tilling, etc. based on the type of vehicle 102 and/or implement 104 used. While three of the subsystems 106A, 106B, 106C are illustrated in FIG. 1, a different number of the subsystems 106A, 106B, 106C may be used instead. As used herein, when referring to "the subsystem 106," it is to be understood that the description and/or illustration applies to any of the subsystems 106A, 106B, 106C of FIG. 1.

In the illustrated example of FIG. 1, the subsystem 106 includes an example device 108 communicatively and/or operatively coupled to an example controller 110. In this example, the controller 110 can send control signals to the device 108 via an example output connection (e.g., an output wire) 112, and the controller 110 can obtain feedback signals from the device 108 via an example input connection (e.g., an input wire) 114. While the output and input connections 112, 114 in this example are wired connections, the controller 110 and the device 108 can communicate via wireless signals in other examples. In the illustrated example, the device 108 can be, for example, a sensor, an actuator, a sprayer, a planter, or another type of device for performing at least one of the agricultural tasks. While the example controller 110 of FIG. 1 is communicatively and/or operatively coupled to a single device (e.g., the device 108), in other examples, the controller 110 may be communicatively and/or operatively coupled to one or more additional devices to control and/or obtain performance data therefrom.

In the illustrated example of FIG. 1, the device 108 is electrically coupled to a first example power source (e.g., a battery) 116 via a first example wired connection 118, where the first power source 116 supplies power to the device 108. Further, the device 108 also includes a first example grounded connection 120. In the illustrated example, the controller 110 is electrically coupled to a second example power source 124 via a second example wired connection 126, where the second power source 124 supplies power to the controller 110. The controller 110 also includes a second example grounded connection 128.

In the illustrated example of FIG. 1, the vehicle 102 includes example vehicle control circuitry 132 to control and/or monitor one or more components in the subsystem(s) 106. For example, the vehicle control circuitry 132 can determine, based on performance data from the subsystem 106, whether one or more components are performing as expected. In this example, the vehicle control circuitry 132 includes example subsystem monitoring circuitry 134, an example vehicle database 136, example report generation circuitry 138, and example communication interface circuitry 140. In the illustrated example of FIG. 1, the vehicle control circuitry 132 is configured as a centralized control system that is communicatively and/or operatively coupled to each of the subsystems 106A, 106B, 106C. However, in other examples, the vehicle 102 can include a distributed control system in which an instance of the vehicle control circuitry 132 can be implemented in each of the subsystems 106A, 106B, 106C.

The communication interface circuitry 140 is communicatively coupled to the controller 110 to obtain performance data and/or diagnostic information therefrom. For example, in response to the controller 110 obtaining the performance data from the device 108 via the input connection 114, the controller 110 can continuously and/or periodically send the performance data to the communication interface circuitry 140 via a wired and/or wireless connection. When the device 108 is a sensor, for example, the performance data can include sensor data collected by the device 108, such as spectral measurements associated with an agricultural sample. In other examples, when the device 108 is a sprayer, the performance data can include an output flow rate of the sprayer. Additionally or alternatively, the performance data can include device identification information that identifies a type, model, and/or age of the device 108, and/or includes a location of the device 108 and/or the controller 110 on the implement 104. In some examples, the communication interface circuitry 140 causes storage of the performance data in the vehicle database 136. In some examples, the communication interface circuitry 140 can cause, via a control signal, the controller 110 to switch to a diagnostic mode in which the controller 110 sends one or more query signals to the device 108 and monitors a response of the device 108 to the query signal(s).

In the illustrated example of FIG. 1, the vehicle database 136 stores performance data and/or reference data utilized and/or obtained by the vehicle control circuitry 132. The example vehicle database 136 of FIG. 1 is implemented by any memory, storage device and/or storage disc for storing data such as, for example, flash memory, magnetic media, optical media, solid state memory, hard drive(s), thumb drive(s), etc. Furthermore, the data stored in the example vehicle database 136 may be in any data format such as, for example, binary data, comma delimited data, tab delimited data, structured query language (SQL) structures, etc. While, in the illustrated example, the example vehicle database 136 is illustrated as a single device, the example vehicle database 136 and/or any other data storage devices described herein may be implemented by any number and/or type(s) of memories.

The subsystem monitoring circuitry 134 monitors the performance data from the controller 110 to determine whether one or more components of the subsystem 106 is/are performing as expected. For example, the subsystem monitoring circuitry 134 compares the performance data to one or more thresholds based on the reference data from the vehicle database 136, where the reference data represents expected values for one or more parameters of the subsystem 106. In such examples, the subsystem monitoring circuitry 134 determines that the one or more components are not functioning as expected in response to the performance data not satisfying the one or more thresholds. In one example, when the performance data includes an output flow rate of the device 108, the subsystem monitoring circuitry 134 determines whether the output flow rate satisfies a threshold flow rate based on the reference data. In response to the output flow rate not satisfying the threshold flow rate, the subsystem monitoring circuitry 134 detects a problem with the device 108. In another example, the subsystem monitoring circuitry 134 detects a problem in response to the communication interface circuitry 140 not receiving performance data from the controller 110. In still another example, the subsystem monitoring circuitry 134 detects a problem when the performance data indicates an intermittent response from at least one of the device 108 or the controller 110.

In the illustrated example of FIG. 1, the report generation circuitry 138 generates one or more diagnostic reports based on the performance data and/or the problem detected by the subsystem monitoring circuitry 134. For example, in response to the subsystem monitoring circuitry 134 detecting a problem with one or more components of the subsystem 106, the report generation circuitry 138 generates a diagnostic report including the type of problem detected (e.g., the output flow rate of the device 108 not satisfying a threshold flow rate), a location of the controller 110 and/or the device 108 on the implement 104 (e.g., a particular row of the implement 104), a type, model, and/or age of the device 108, etc. In some examples, the diagnostic report includes a diagnostic code generated by the report generation circuitry 138, where the diagnostic code is indicative of the type of problem detected. In some examples, the communication interface circuitry 140 provides, via an example network 142, the diagnostic report to example diagnostic application circuitry 144 implemented on an example mobile device 146.

In the illustrated example of FIG. 1, the diagnostic application circuitry 144 provides instructions to an operator of the vehicle for diagnosing a problem detected by the vehicle control circuitry 132. For example, the diagnostic application circuitry 144 obtains diagnostic information from the diagnostic reports provided by the vehicle control circuitry 132, and provides the diagnostic information to example cloud circuitry 148 via the network 142. At the example cloud circuitry 148, one or more machine learning models are executed based on the diagnostic information to output probable sources of and/or solutions to the detected problem. For example, the machine learning model(s) is/are trained based on historical data gathered from multiple vehicles. In some examples, the historical data includes known solutions to previously-detected problems in electronic systems of the multiple vehicles.

In some examples, the diagnostic application circuitry 144 obtains and/or evaluates the output from the machine learning model(s). In some examples, the output identifies one or more possible causes of the detected problem, such as loss of power to the device 108 and/or the controller 110, disconnection of and/or damage to one or more connectors in the subsystem 106, dirt and/or blockage in the device 108, etc. The output can also include a probability associated with each component of the subsystem 106, where the probability indicates a likelihood that the corresponding component is a source of the detected problem.

In some examples, the diagnostic application circuitry 144 generates instructions based on the output and displays the instructions to the operator via an example screen (e.g., touch screen) 150 of the mobile device 146. For example, the diagnostic application circuitry 144 can select a first component for testing based on the probabilities. In such examples, the diagnostic application circuitry 144 generates instructions indicating to the operator how to access the first component and/or test a functionality of the first component. In some examples, the diagnostic application circuitry 144 displays, via the screen 150, a map of the electronic system of the vehicle 102 to provide guidance to the operator when locating the first component.

In some examples, the diagnostic application circuitry 144 monitors a response of the first component to a test performed by the operator. For example, when the first component is a wired connection, the test can include manually shaking or moving the wired connection and determining whether a signal is affected. When the response indicates that the first component is operating as expected, the diagnostic application circuitry 144 selects a second component based on the output and provides instructions to the operator for testing the second component. In some examples, the diagnostic application circuitry 144 directs the operator to perform testing of each of the possible sources until an actual source of the problem is detected and/or until each of the possible sources has been tested. In some examples, in response to identifying the actual source of the detected problem, the diagnostic application circuitry 144 can determine one or more solutions to the problem (e.g., repair and/or replacement of a component, removal of blockage from the component, etc.).

In some examples, the vehicle control circuitry 132 includes means for communicating. For example, the means for communicating may be implemented by the communication interface circuitry 140. In some examples, the communication interface circuitry 140 may be implemented by machine executable instructions such as that implemented by at least blocks 402, 412 of FIG. 4 executed by processor circuitry, which may be implemented by the example processor circuitry 812 of FIG. 8, the example processor circuitry 1100 of FIG. 11, and/or the example Field Programmable Gate Array (FPGA) circuitry 1200 of FIG. 12. In other examples, the communication interface circuitry 140 is implemented by other hardware logic circuitry, hardware implemented state machines, and/or any other combination of hardware, software, and/or firmware. For example, the communication interface circuitry 140 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the vehicle control circuitry 132 includes means for monitoring. For example, the means for monitoring may be implemented by the subsystem monitoring circuitry 134. In some examples, the subsystem monitoring circuitry 134 may be implemented by machine executable instructions such as that implemented by at least blocks 404, 406, 408, 414 of FIG. 4 executed by processor circuitry, which may be implemented by the example processor circuitry 812 of FIG. 8, the example processor circuitry 1100 of FIG. 11, and/or the example Field Programmable Gate Array (FPGA) circuitry 1200 of FIG. 12. In other examples, the communication interface circuitry 140 is implemented by other hardware logic circuitry, hardware implemented state machines, and/or any other combination of hardware, software, and/or firmware. For example, the subsystem monitoring circuitry 134 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the vehicle control circuitry 132 includes means for generating reports. For example, the means for generating reports may be implemented by the report generation circuitry 138. In some examples, the report generation circuitry 138 may be implemented by machine executable instructions such as that implemented by at least block 410 of FIG. 4 executed by processor circuitry, which may be implemented by the example processor circuitry 812 of FIG. 8, the example processor circuitry 1100 of FIG. 11, and/or the example Field Programmable Gate Array (FPGA) circuitry 1200 of FIG. 12. In other examples, the report generation circuitry 138 is implemented by other hardware logic circuitry, hardware implemented state machines, and/or any other combination of hardware, software, and/or firmware. For example, the report generation circuitry 138 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the vehicle control circuitry 132 of FIG. 1 is illustrated in FIG. 1, one or more of the elements, processes, and/or devices illustrated in FIG. 1 may be combined, divided, re-arranged, omitted, eliminated, and/or implemented in any other way. Further, the example subsystem monitoring circuitry 134, the example report generation circuitry 138, the example communication interface circuitry 140, the example vehicle database 136, and/or, more generally, the example vehicle control circuitry 132 of FIG. 1, may be implemented by hardware, software, firmware, and/or any combination of hardware, software, and/or firmware. Thus, for example, any of the example subsystem monitoring circuitry 134, the example report generation circuitry 138, the example communication interface circuitry 140, the example vehicle database 136, and/or, more generally, the example vehicle control circuitry 132, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example subsystem monitoring circuitry 134, the example report generation circuitry 138, the example communication interface circuitry 140, and/or the example vehicle database 136 is/are hereby expressly defined to include a non-transitory computer readable storage device or storage disk such as a memory, a digital versatile disk (DVD), a compact disk (CD), a Blu-ray disk, etc., including the software and/or firmware. Further still, the example vehicle control circuitry 132 of FIG. 1 may include one or more elements, processes, and/or devices in addition to, or instead of, those illustrated in FIG. 1, and/or may include more than one of any or all of the illustrated elements, processes and devices.

Figure 2:
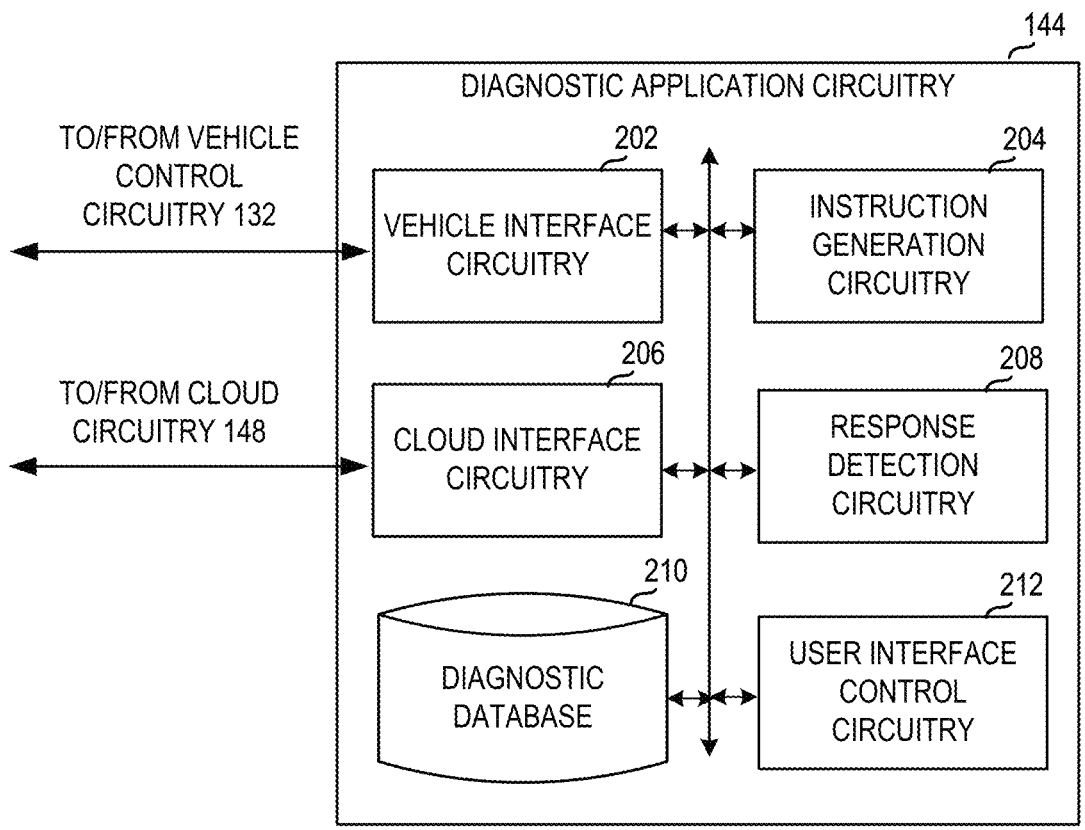
FIG. 2 is a block diagram of example diagnostic application circuitry that can be implemented in a mobile device in the example environment of FIG. 1.

FIG. 2 is a block diagram of the example diagnostic application circuitry 144 that can be implemented in the example mobile device 146 in the example environment 100 of FIG. 1. For example, the diagnostic application circuitry 144 can be implemented as an application on the mobile device 146 that allows an operator of the mobile device 146 to view and/or request diagnostic information, obtain and/or interact with a map of an electronic system of the vehicle 102 of FIG. 1, obtain instructions for diagnosing a problem with the vehicle 102, etc. In the illustrated example of FIG. 2, the diagnostic application circuitry 144 includes example vehicle interface circuitry 202, example instruction generation circuitry 204, example cloud interface circuitry 206, example response detection circuitry 208, an example diagnostic database 210, and example user interface control circuitry 212.

In the illustrated example of FIG. 2, the vehicle interface circuitry 202 is communicatively coupled to the vehicle control circuitry 132 via the communication interface circuitry 140 of FIG. 1. In some examples, the vehicle interface circuitry 202 receives and/or otherwise obtains diagnostic reports generated at the vehicle control circuitry 132. In some examples, the vehicle interface circuitry 202 determines diagnostic information from the diagnostic reports, where the diagnostic information includes vehicle information associated with the vehicle 102 of FIG. 1 (e.g., a model and/or year of the vehicle 102), a diagnostic code associated with a detected problem (e.g., identifying a type and/or description of the detected problem), a model and/or age of an affected component, a location of the affected component, etc. In some examples, the vehicle interface circuitry 202 causes storage of the diagnostic information in the diagnostic database 210. In some examples, the vehicle interface circuitry 202 provides commands to the vehicle control circuitry 132. For example, during testing of a component, the vehicle interface circuitry 202 may command the vehicle control circuitry 132 to switch a corresponding controller (e.g., the controller 110 of FIG. 1) to a diagnostic mode. In such examples, the controller 110 in the diagnostic mode can send one or more query signals to the component to cause and/or initiate a response from the component.

In the illustrated example of FIG. 2, the diagnostic database 210 stores diagnostic information utilized and/or obtained by the diagnostic application circuitry 144. The example diagnostic database 210 of FIG. 2 is implemented by any memory, storage device and/or storage disc for storing data such as, for example, flash memory, magnetic media, optical media, solid state memory, hard drive(s), thumb drive(s), etc. Furthermore, the data stored in the example diagnostic database 210 may be in any data format such as, for example, binary data, comma delimited data, tab delimited data, structured query language (SQL) structures, etc. While, in the illustrated example, the example diagnostic database 210 is illustrated as a single device, the example diagnostic database 210 and/or any other data storage devices described herein may be implemented by any number and/or type(s) of memories.

In the illustrated example of FIG. 2, the cloud interface circuitry 206 is communicatively coupled to the example cloud circuitry 148 via the network 142 of FIG. 1. In some examples, the cloud interface circuitry 206 provides diagnostic information to the cloud circuitry 148 to enable execution of one or more machine learning models therein. Furthermore, the cloud interface circuitry 206 can obtain output data from the cloud circuitry 148, where the output data corresponds to an output of the machine learning model(s) executed by the cloud circuitry 148 based on the diagnostic information. In some examples, the output data includes one or more possible sources and/or causes of a detected problem. For example, the output data can identify one or more components that may be causing the detected problem. The output data can also include probabilities associated with the possible sources and/or causes, where the probabilities indicate a likelihood that each of the possible sources and/or causes is an actual (e.g., true) source and/or cause of the detected problem.

The instruction generation circuitry 204 generates instructions that may be executed by the operator to perform one or more tests on the vehicle 102. In some examples, instruction generation circuitry 204 generates the instructions based on the output data from the cloud circuitry 148. For example, the instruction generation circuitry 204 selects, from the output data, one or more of the components that may be causing the detected problem. In some such examples, the instruction generation circuitry 204 selects the component(s) corresponding to a largest one of the probabilities (e.g., the component(s) likely to be the actual cause of the detected problem). Furthermore, the instruction generation circuitry 204 generates the instructions to instruct the operator on where to locate and/or how to access the selected component(s). For example, the instruction generation circuitry 204 can obtain, from the diagnostic database 210, a map of the vehicle 102 and/or the electronic system of the vehicle 102. In such an example, the instruction generation circuitry 204 identifies and/or indicates the location(s) of the selected component(s) on the map, and/or generates a description of where and/or how to access the selected component(s).

In the illustrated example of FIG. 2, the user interface control circuitry 212 can cause the mobile device 146 of FIG. 1 to display the instructions (e.g., including the map and/or the description) on the screen 150. In some examples, the screen 150 is a touch screen, and the map is an interactive map with which the operator can interact by manually selecting and/or highlighting portions of the map, enlarging and/or reducing portions of the map, rotating the map, making portions of the map transparent, etc. In some examples, the map implemented on the mobile device 146 enables the operator to locate the selected component(s) when the operator is far from a cab and/or a display screen of the vehicle 102.

In some examples, the instruction generation circuitry 204 generates the instructions to instruct the operator on how to test the selected component(s). In one example, when the detected problem is an irregular and/or intermittent signal from the device 108 to the controller 110, the instructions may direct the operator to inspect whether a wire (e.g., the input connection 114 of FIG. 1) between the device 108 and the controller 110 is connected. Additionally or alternatively, the instructions can direct the operator to move and/or shake the input connection 114 and monitor a change in the signal to the controller 110. In other examples, the instructions may be different based on the detected problem and/or the selected component(s) to be tested. For example, the instructions can include directing the operator to check for a blockage in a tube when a planter is not expelling seed, check for a buildup of dirt on a sensor when the sensor is providing incomplete and/or inaccurate data, etc.

In the illustrated example of FIG. 2, the response detection circuitry 208 detects the response of the component(s) to one or more query signals sent from the controller 110 and/or to testing (e.g., manual inspection) by the operator. For example, the response detection circuitry 208 can obtain, via the vehicle interface circuitry 202, feedback data (e.g., a feedback signal) from the controller 110, where the feedback data represents the response of the component(s). In some examples, the response detection circuitry 208 compares the response to an expected response of the selected component(s), where the expected response is based on historical data stored in the diagnostic database 210. For example, in response to determining that the selected component produces the expected response, the response detection circuitry 208 determines that the selected component is not a source of the detected problem. Alternatively, in response to determining that the selected component does not produce the expected response, the response detection circuitry 208 determines that the selected component is a source of the detected problem.

Additionally or alternatively, the operator can provide user input, via the mobile device 146, to indicate whether the selected component is a source of the detected problem based on whether the selected component satisfies one or more conditions. For example, when the operator performs a visual and/or manual inspection of the selected component, the operator can indicate, via the user input, whether the condition(s) is/are satisfied. In some examples, the condition(s) can include whether a power supply is turned on and/or connected to the component, whether dirt and/or other contaminants are causing a blockage in the component, etc. In the illustrated example of FIG. 2, the user interface control circuitry 212 monitors the user input provided to the mobile device 146 by, for example, the operator selecting one or more options on the screen 150 and/or manually entering information into the mobile device 146. In some examples, the user interface control circuitry 212 provides the user input to the response detection circuitry 208.

In the illustrated example of FIG. 2, the response detection circuitry 208 determines whether the selected component is a source of the detected problem. For example, the response detection circuitry 208 determines that the selected component is a source of the detected problem in response to the component not producing an expected response and/or not satisfying one or more conditions. In response to determining that the selected component is a source of the detected problem, the response detection circuitry 208 causes storage of component identification information (e.g., a location, model, and/or age of the selected component) in the diagnostic database 210, where the component identification information is obtained from the diagnostic report. In some examples, the response detection circuitry 208 causes storage of the diagnostic code of the detected problem in association with the component identification information. In some examples, the cloud interface circuitry 206 provides the component identification information and the diagnostic code to the cloud circuitry 148 for storage and/or for training and/or re-training of one or more machine learning model(s).

In some examples, in response to the response detection circuitry 208 determining that the selected component is a source of the detected problem, the instruction generation circuitry 204 provides one or more solutions for the detected problem. For example, the solution(s) can include reconnecting a wire to the selected component, turning on a power supply for the selected component, replacement and/or repair of the selected component, etc. Alternatively, in response to the response detection circuitry 208 determining that the selected component (e.g., a first component) is not a source of the detected problem, the instruction generation circuitry 204 selects one or more second components to test based on the output data from the cloud circuitry 148. In some examples, the diagnostic application circuitry 144 further selects additional components to test until the source of the detected problem is determined and/or until each of the components identified in the output data has been tested.

In some examples, the diagnostic application circuitry 144 includes means for interfacing with a vehicle. For example, the means for interfacing with a vehicle may be implemented by the vehicle interface circuitry 202. In some examples, the vehicle interface circuitry 202 may be implemented by machine executable instructions such as that implemented by at least blocks 502, 510 of FIG. 5 executed by processor circuitry, which may be implemented by the example processor circuitry 912 of FIG. 9, the example processor circuitry 1100 of FIG. 11, and/or the example Field Programmable Gate Array (FPGA) circuitry 1200 of FIG. 12. In other examples, the vehicle interface circuitry 202 is implemented by other hardware logic circuitry, hardware implemented state machines, and/or any other combination of hardware, software, and/or firmware. For example, the vehicle interface circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the diagnostic application circuitry 144 includes means for generating instructions. For example, the means for generating instructions may be implemented by the instruction generation circuitry 204. In some examples, the instruction generation circuitry 204 may be implemented by machine executable instructions such as that implemented by at least blocks 508, 512, 522 of FIG. 5 executed by processor circuitry, which may be implemented by the example processor circuitry 912 of FIG. 9, the example processor circuitry 1100 of FIG. 11, and/or the example Field Programmable Gate Array (FPGA) circuitry 1200 of FIG. 12. In other examples, the instruction generation circuitry 204 is implemented by other hardware logic circuitry, hardware implemented state machines, and/or any other combination of hardware, software, and/or firmware. For example, the instruction generation circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the diagnostic application circuitry 144 includes means for interfacing with a cloud. For example, the means for interfacing with the cloud may be implemented by the cloud interface circuitry 206. In some examples, the cloud interface circuitry 206 may be implemented by machine executable instructions such as that implemented by at least blocks 504, 506 of FIG. 5 executed by processor circuitry, which may be implemented by the example processor circuitry 912 of FIG. 9, the example processor circuitry 1100 of FIG. 11, and/or the example Field Programmable Gate Array (FPGA) circuitry 1200 of FIG. 12. In other examples, the cloud interface circuitry 206 is implemented by other hardware logic circuitry, hardware implemented state machines, and/or any other combination of hardware, software, and/or firmware. For example, the cloud interface circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the diagnostic application circuitry 144 includes means for detecting. For example, the means for detecting may be implemented by the response detection circuitry 208. In some examples, the response detection circuitry 208 may be implemented by machine executable instructions such as that implemented by at least blocks 516, 518, 520 of FIG. 5 executed by processor circuitry, which may be implemented by the example processor circuitry 912 of FIG. 9, the example processor circuitry 1100 of FIG. 11, and/or the example Field Programmable Gate Array (FPGA) circuitry 1200 of FIG. 12. In other examples, the response detection circuitry 208 is implemented by other hardware logic circuitry, hardware implemented state machines, and/or any other combination of hardware, software, and/or firmware. For example, the response detection circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the diagnostic application circuitry 144 includes means for controlling a user interface. For example, the means for controlling the user interface may be implemented by the user interface control circuitry 212. In some examples, the user interface control circuitry 212 may be implemented by machine executable instructions such as that implemented by at least blocks 514, 524 of FIG. 5 executed by processor circuitry, which may be implemented by the example processor circuitry 912 of FIG. 9, the example processor circuitry 1100 of FIG. 11, and/or the example Field Programmable Gate Array (FPGA) circuitry 1200 of FIG. 12. In other examples, the user interface control circuitry 212 is implemented by other hardware logic circuitry, hardware implemented state machines, and/or any other combination of hardware, software, and/or firmware. For example, the user interface control circuitry 212 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the diagnostic application circuitry 144 of FIG. 1 is illustrated in FIG. 2, one or more of the elements, processes, and/or devices illustrated in FIG. 2 may be combined, divided, re-arranged, omitted, eliminated, and/or implemented in any other way. Further, the example vehicle interface circuitry 202, the example instruction generation circuitry 204, the example cloud interface circuitry 206, the example response detection circuitry 208, the example user interface control circuitry 212, the example diagnostic database 210, and/or, more generally, the example diagnostic application circuitry 144 of FIG. 2, may be implemented by hardware, software, firmware, and/or any combination of hardware, software, and/or firmware. Thus, for example, any of the example vehicle interface circuitry 202, the example instruction generation circuitry 204, the example cloud interface circuitry 206, the example response detection circuitry 208, the example user interface control circuitry 212, the example diagnostic database 210, and/or, more generally, the example diagnostic application circuitry 144, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example vehicle interface circuitry 202, the example instruction generation circuitry 204, the example cloud interface circuitry 206, the example response detection circuitry 208, the example user interface control circuitry 212, and/or the example diagnostic database 210 is/are hereby expressly defined to include a non-transitory computer readable storage device or storage disk such as a memory, a digital versatile disk (DVD), a compact disk (CD), a Blu-ray disk, etc., including the software and/or firmware. Further still, the example diagnostic application circuitry 144 of FIG. 1 may include one or more elements, processes, and/or devices in addition to, or instead of, those illustrated in FIG. 2, and/or may include more than one of any or all of the illustrated elements, processes and devices.

Figure 3:
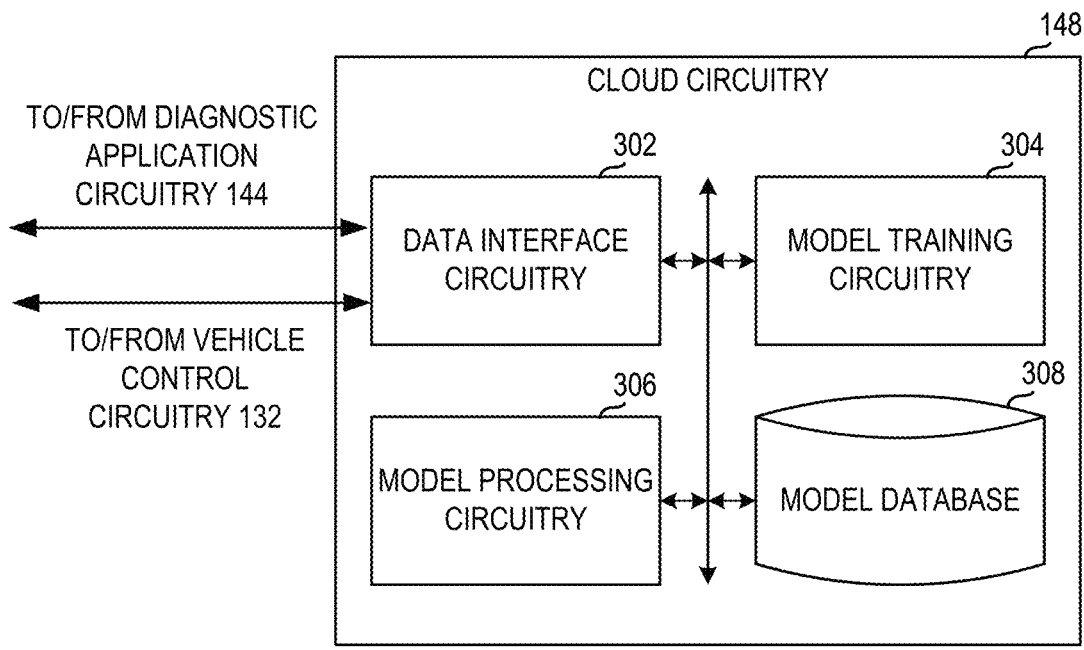
FIG. 3 is a block diagram of example cloud circuitry that can be implemented in the environment of FIG. 1.

FIG. 3 is a block diagram of the example cloud circuitry 148 that can be implemented in the example environment 100 of FIG. 1. In some examples, the cloud circuitry 148 is configured to generate, train, and/or execute one or more machine learning models based on diagnostic information from the diagnostic application circuitry 144 of FIGS. 1 and/or 2. In the illustrated example of FIG. 3, the cloud circuitry 148 includes example data interface circuitry 302, example model training circuitry 304, example model processing circuitry 306, and an example model database 308.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a neural network model can be used. In general, machine learning models/architectures that are suitable to use in the example approaches disclosed herein will be CNN based neural networks. However, other types of machine learning models could additionally or alternatively be used.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In some examples disclosed herein, ML/AI models are trained using stochastic gradient descent. However, any other training algorithm may additionally or alternatively be used. In examples disclosed herein, training is performed until a targeted accuracy level is reached (e.g., >95%). Training is performed using hyperparameters that control how the learning is performed (e.g., a learning rate, a number of layers to be used in the machine learning model, etc.). In other examples, pre-trained model(s) are used. In some examples re-training may be performed. Such re-training may be performed in response to, for example, new data being obtained by the cloud circuitry 148.

Training is performed using training data. In examples disclosed herein, the training data originates from previously collected diagnostic information (e.g., historical information, historical data) of multiple vehicles, including diagnostic codes associated with previously detected problems in the vehicles, determined sources and/or causes of the previously detected problems, components associated with the previously detected problems, solutions for the previously detected problems, etc. Because supervised training is used, the training data is labeled.

Once training is complete, the model is deployed for use as an executable construct that processes an input and provides an output based on the network of nodes and connections defined in the model. In examples disclosed herein, the model(s) are stored at one or more databases (e.g., the model database 308 of FIG. 3). The model(s) may then be executed by the model processing circuitry 306 of the example cloud circuitry 148 of FIG. 3.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Referring to FIG. 3, the data interface circuitry 302 is communicatively coupled, via the network 142 of FIG. 1, to the diagnostic application circuitry 144 and/or the vehicle control circuitry 132 of FIG. 1. In some examples, the data interface circuitry 302 receives and/or otherwise obtains diagnostic information from the diagnostic application circuitry 144 and/or the vehicle control circuitry 132, where the diagnostic information includes vehicle information associated with the vehicle 102 of FIG. 1 (e.g., a model and/or year of the vehicle 102), a diagnostic code associated with problem detected by the vehicle control circuitry 132, one or more components associated with the detected problem, etc. In some examples, the data interface circuitry 302 causes storage of the diagnostic information in the model database 308. Furthermore, the data interface circuitry 302 can provide output data from one or more executed machine learning models to the diagnostic application circuitry 144 for use in generating testing instructions and/or diagnosing a detected problem with the vehicle 102 and/or the implement 104 of FIG. 1.

In some examples, the data interface circuitry 302 obtains historical data from multiple vehicles communicatively coupled to the cloud circuitry 148. For example, the historical data can include diagnostic information from the multiple vehicles that can be used to generate and/or train the machine learning model(s). In some examples, the historical data includes previous problems detected by the vehicles, identified causes and/or sources of the previously detected problems, and/or known solutions to the previously detected problems.

The example model training circuitry 304 performs training of the machine learning model(s) (e.g., neural network(s)) implemented by the model processing circuitry 306. In the example of FIG. 3, training data can be stored in the model database 308 and can include the historical data with labels identifying the previously detected problems and the corresponding components and/or sources associated with the previously detected problems. In some examples, the model training circuitry 304 trains the machine learning model(s) based on the labeled historical data. For example, the model training circuitry 304 correlates the previously detected problems with the corresponding components and/or sources, and adjusts one or more parameters of the machine learning model(s) based on the correlation. In such examples, the model training circuitry 304 trains the machine learning model(s) to output possible causes and/or sources based on diagnostic information input to the machine learning model(s). The machine learning model(s) is/are stored in the model database 308 that is accessible by the model processing circuitry 306. In other examples, the machine learning model(s) is/are stored in a different database.

The example model processing circuitry 306 executes the machine learning model(s) based on the diagnostic information (e.g., the diagnostic code, the location and/or type of problem, etc.) associated with a problem detected by the vehicle control circuitry 132. As a result of the execution of the machine learning model(s), the model processing circuitry 306 outputs the output data including one or more possible components that may be a source of the detected problem. In some examples, the output data is provided, via the data interface circuitry 302, to the diagnostic application circuitry 144 for generating instructions to test the component(s) and identify the actual source of the problem. In some examples, in response to identifying the actual source of the problem, the diagnostic application circuitry 144 provides the identified actual source (e.g., component(s)) of the detected problem to the cloud circuitry 148 for re-training and/or further refinement of the machine learning model(s).

In some examples, the cloud circuitry 148 includes means for obtaining data. For example, the means for obtaining data may be implemented by the data interface circuitry 302. In some examples, the data interface circuitry 302 may be implemented by machine executable instructions such as that implemented by at least block 602 of FIG. 6 and/or blocks 702, 708 of FIG. 7 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the data interface circuitry 302 is implemented by other hardware logic circuitry, hardware implemented state machines, and/or any other combination of hardware, software, and/or firmware. For example, the data interface circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the cloud circuitry 148 includes means for training. For example, the means for training may be implemented by the model training circuitry 304. In some examples, the model training circuitry 304 may be implemented by machine executable instructions such as that implemented by at least blocks 604, 606, 608 of FIG. 6 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the model training circuitry 304 is implemented by other hardware logic circuitry, hardware implemented state machines, and/or any other combination of hardware, software, and/or firmware. For example, the model training circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the cloud circuitry 148 includes means for processing. For example, the means for processing may be implemented by the model processing circuitry 306. In some examples, the model processing circuitry 306 may be implemented by machine executable instructions such as that implemented by at least blocks 704, 706 of FIG. 7 executed by processor circuitry, which may be implemented by the example processor circuitry 1012 of FIG. 10, the example processor circuitry 1100 of FIG. 11, and/or the example Field Programmable Gate Array (FPGA) circuitry 1200 of FIG. 12. In other examples, the model processing circuitry 306 is implemented by other hardware logic circuitry, hardware implemented state machines, and/or any other combination of hardware, software, and/or firmware. For example, the model processing circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the cloud circuitry 148 of FIG. 1 is illustrated in FIG. 3, one or more of the elements, processes, and/or devices illustrated in FIG. 3 may be combined, divided, re-arranged, omitted, eliminated, and/or implemented in any other way. Further, the example data interface circuitry 302, the example model training circuitry 304, the example model processing circuitry 306, the example model database 308, and/or, more generally, the example cloud circuitry 148 of FIG. 3, may be implemented by hardware, software, firmware, and/or any combination of hardware, software, and/or firmware. Thus, for example, any of the example data interface circuitry 302, the example model training circuitry 304, the example model processing circuitry 306, the example model database 308, and/or, more generally, the example cloud circuitry 148, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example data interface circuitry 302, the example model training circuitry 304, the example model processing circuitry 306, and/or the example model database 308 is/are hereby expressly defined to include a non-transitory computer readable storage device or storage disk such as a memory, a digital versatile disk (DVD), a compact disk (CD), a Blu-ray disk, etc., including the software and/or firmware. Further still, the example cloud circuitry 148 of FIG. 1 may include one or more elements, processes, and/or devices in addition to, or instead of, those illustrated in FIG. 3, and/or may include more than one of any or all of the illustrated elements, processes and devices.

Figure 4:
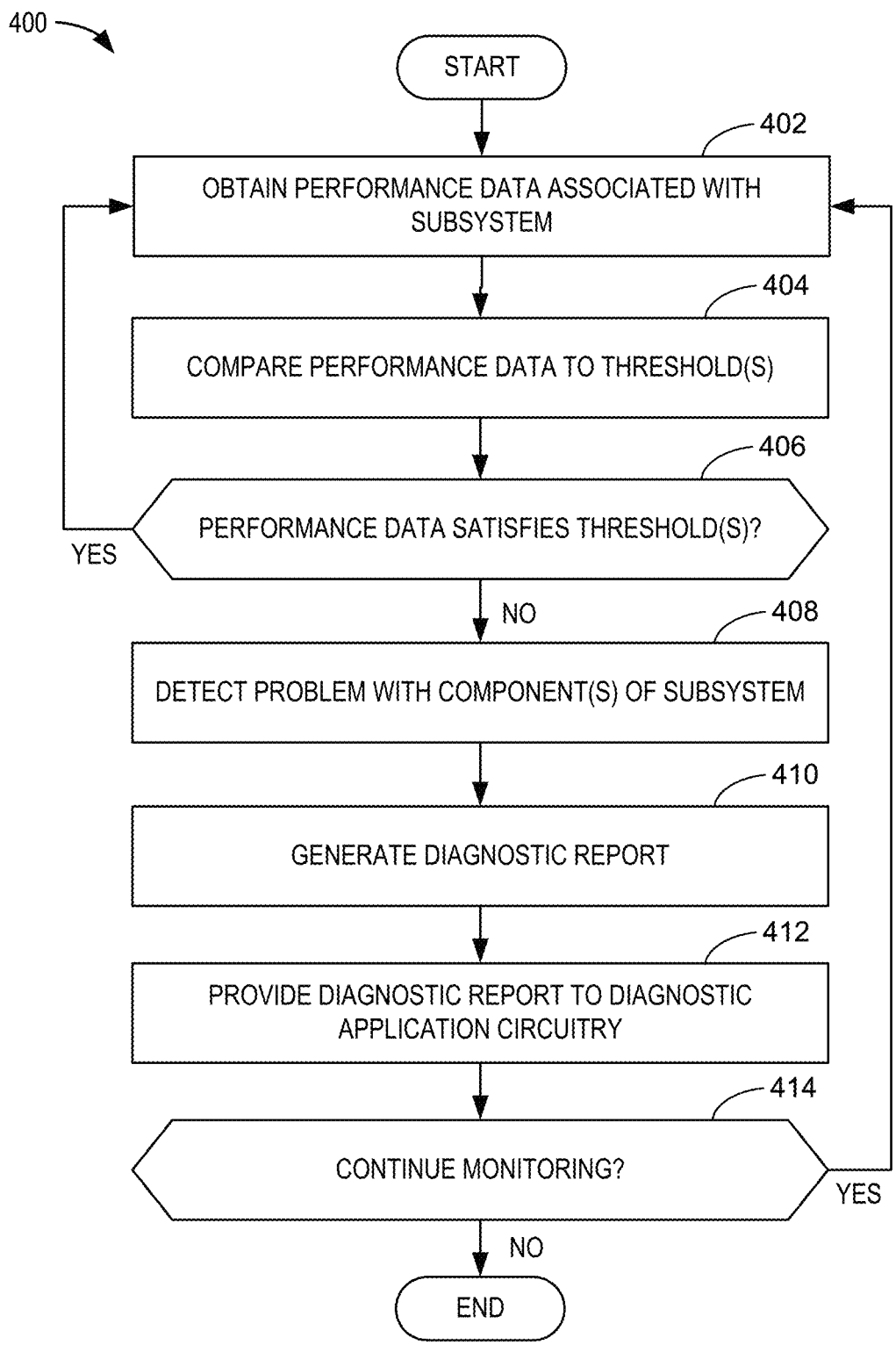
FIG. 4 is a flowchart representative of example machine readable instructions that may be executed by example processor circuitry to implement example vehicle control circuitry implemented on an example vehicle of FIG. 1.
Figure 5:
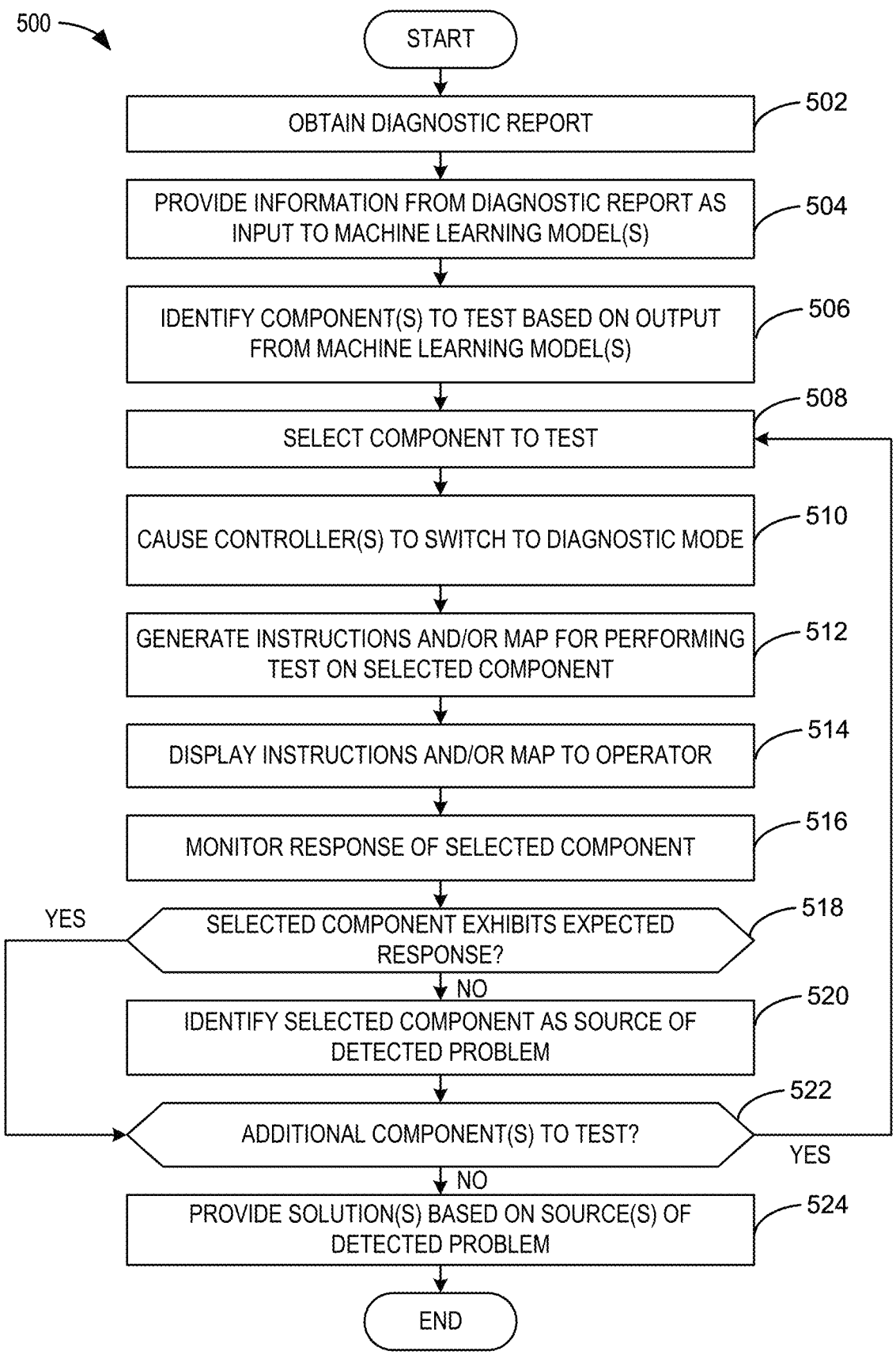
FIG. 5 is a flowchart representative of example machine readable instructions that may be executed by example processor circuitry to implement the example diagnostic application circuitry of FIG. 2.
Figure 6:
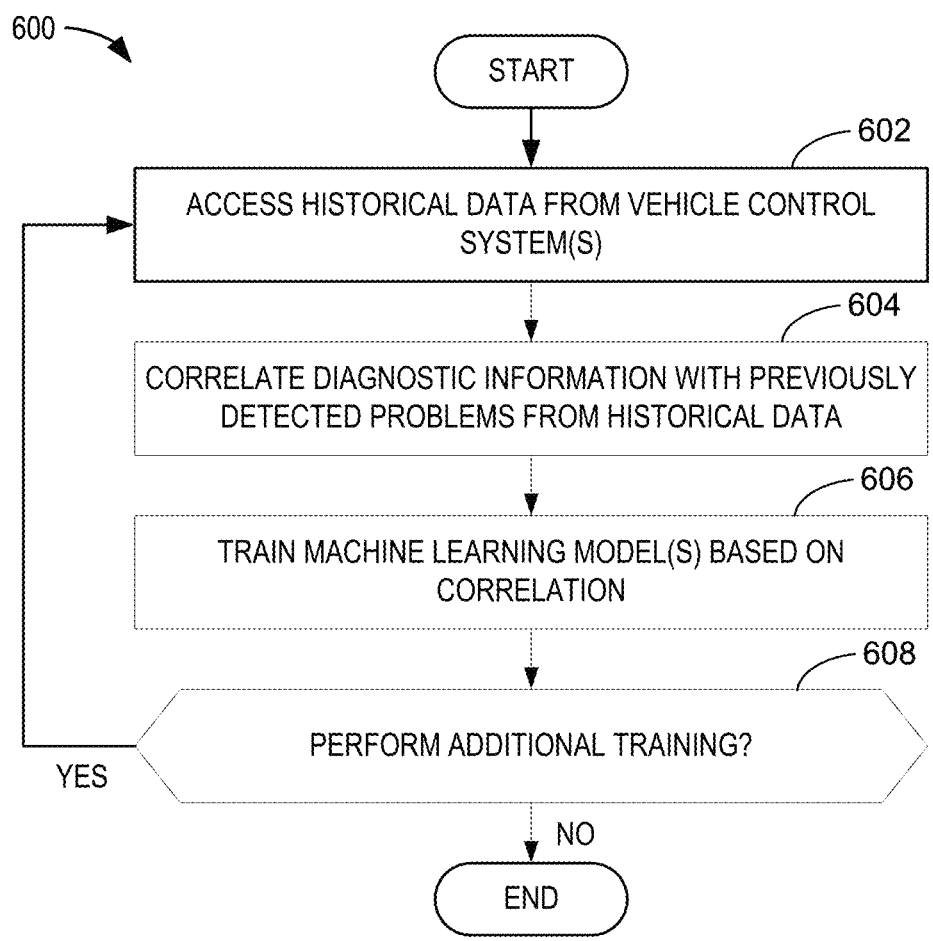
FIG. 6 is a flowchart representative of example machine readable instructions that may be executed by example processor circuitry to implement the example cloud circuitry of FIG. 3 to generate and/or train one or more machine learning models.
Figure 7:
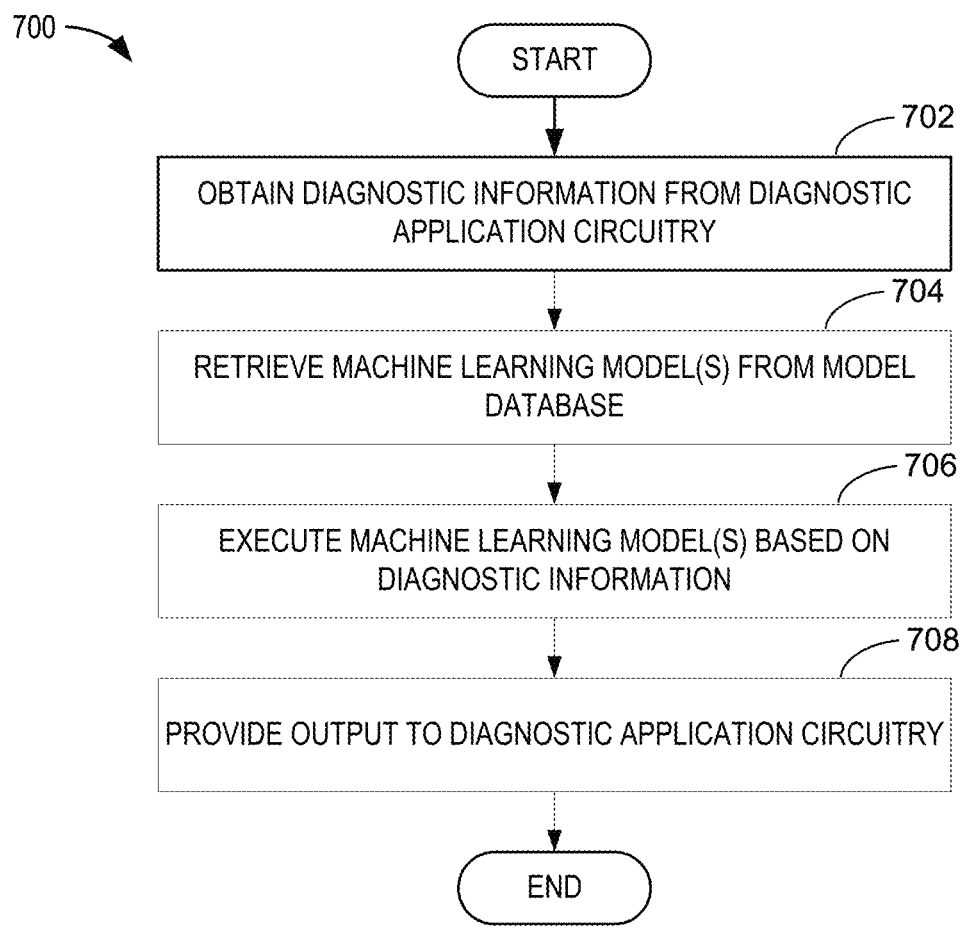
FIG. 7 is a flowchart representative of example machine readable instructions that may be executed by example processor circuitry to implement the example cloud circuitry of FIG. 3 to execute the one or more machine learning models.

A flowchart representative of example hardware logic circuitry, machine readable instructions, hardware implemented state machines, and/or any combination thereof for implementing the vehicle control circuitry 132 of FIG. 1 is shown in FIG. 4. A flowchart representative of example hardware logic circuitry, machine readable instructions, hardware implemented state machines, and/or any combination thereof for implementing the diagnostic application circuitry 144 of FIGS. 1 and/or 2 is shown in FIG. 5. Flowcharts representative of example hardware logic circuitry, machine readable instructions, hardware implemented state machines, and/or any combination thereof for implementing the cloud circuitry 148 of FIGS. 1 and/or 3 are shown in FIGS. 6 and 7. The machine readable instructions may be one or more executable programs or portion(s) of an executable program for execution by processor circuitry, such as the processor circuitry 812, 912, 1012 shown in the example processor platform 800, 900, 1000 discussed below in connection with FIGS. 8, 9, and/or 10 and/or the example processor circuitry discussed below in connection with FIGS. 11 and/or 12. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices.

Further, although the example program is described with reference to the flowchart illustrated in FIGS. 4, 5, 6, and/or 7, many other methods of implementing the example vehicle control circuitry 132, the example diagnostic application circuitry 144, and/or the example cloud circuitry 148 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4, 5, 6, and/or 7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry (e.g., the example vehicle control circuitry 132 of FIG. 1) to control and/or monitor performance of the vehicle 102 of FIG. 1. The machine readable instructions and/or operations 400 of FIG. 4 begin at block 402, at which the example vehicle control circuitry 132 obtains performance data associated with the example subsystem 106 of FIG. 1. For example, the example communication interface circuitry 140 of FIG. 1 obtains the performance data from the example controller 110 of FIG. 1, where the performance data includes, for example, feedback from the device 108 to the controller 110. In one example, when the device 108 is a sensor, the performance data can include sensor data (e.g., images, spectra, etc.) gathered by the device 108. In other example, when the device 108 is a sprayer or a planter, the performance data can include a flow rate, frequency, and/or speed of a substance (e.g., water, fertilizer, seed, etc.) expelled from the device 108.

At block 404, the example vehicle control circuitry 132 compares the performance data to one or more thresholds. For example, the example subsystem monitoring circuitry 134 of FIG. 1 obtains, from the example vehicle database 136 of FIG. 1, the threshold(s) corresponding to a type and/or source of the performance data and/or a device type of the device 108. For example, the threshold(s) can include a threshold (e.g., expected) flow rate of the substance expelled from a sprayer, a threshold amplitude and/or a threshold frequency of spectra collected by a sensor, a threshold data output rate of the device 108, etc.

At block 406, the example vehicle control circuitry 132 determines whether the performance data satisfies the threshold(s). For example, when the device 108 is a sprayer or a planter, the subsystem monitoring circuitry 134 determines whether a measured flow rate of the sprayer satisfies the threshold flow rate. In another example, when the device 108 is a sensor, the subsystem monitoring circuitry 134 determines whether a data output rate of the sensor satisfies the threshold data output rate (e.g., when the data output from the sensor is intermittent or periodic). In response to the subsystem monitoring circuitry 134 determining that the performance data satisfies the threshold(s) (e.g., block 406 returns a result of YES), control returns to block 402. Alternatively, in response to the subsystem monitoring circuitry 134 determining that the performance data does not satisfy the threshold(s) (e.g., block 406 returns a result of NO), control proceeds to block 408.

At block 408, the example vehicle control circuitry 132 detects a problem with one or more components of the subsystem 106. For example, based on the performance data not satisfying the threshold(s), the subsystem monitoring circuitry 134 determines that the component(s) are not functioning properly and, as such, further testing and/or inspection of the component(s) may be required to determine a source and/or cause of the problem. In some examples, the subsystem monitoring circuitry 134 identifies a location of the detected problem (e.g., a location of the implement 104 of FIG. 1 on which the subsystem 106 is implemented) and/or determines a type and/or a description of the detected problem (e.g., a signal from the device 108 to the controller 110 is intermittent, the device 108 is not receiving power, etc.).

At block 410, the example vehicle control circuitry 132 generates a diagnostic report. For example, the example report generation circuitry 138 of FIG. 1 generates the diagnostic report including diagnostic information such as the type and/or description of the detected problem, the location of the detected problem, model and/or age of affected component(s), model and/or age of the vehicle 102, etc. In some examples, the report generation circuitry 138 generates a diagnostic code to include in the diagnostic report, where the diagnostic code represents the type of detected problem.

At block 412, the example vehicle control circuitry 132 provides the diagnostic report to the example diagnostic application circuitry 144 of FIGS. 1 and/or 2. For example, the communication interface circuitry 140 provides the diagnostic report to the diagnostic application circuitry 144 via the network 142 of FIG. 1. In some examples, the communication interface circuitry 140 also causes storage of the diagnostic report in the example vehicle database 136 of FIG. 1.

At block 414, the example vehicle control circuitry 132 determines whether to continue monitoring. For example, the subsystem monitoring circuitry 134 determines whether to continue monitoring based on whether the communication interface circuitry 140 obtains new data from the subsystem 106. In response to the subsystem monitoring circuitry 134 determining to continue monitoring (e.g., block 414 returns a result of YES), control returns to block 402.

FIG. 5 is a flowchart representative of example machine readable instructions and/or example operations 500 that may be executed and/or instantiated by processor circuitry (e.g., the example diagnostic application circuitry 144 of FIGS. 1 and/or 2) to diagnose a problem for one or more components of the vehicle 102 of FIG. 1. The machine readable instructions and/or operations 500 of FIG. 5 begin at block 502, at which the example diagnostic application circuitry 144 obtains a diagnostic report. For example, the example vehicle interface circuitry 202 of FIG. 2 obtains, via the example network 142 of FIG. 1, the diagnostic report generated by the example vehicle control circuitry 132 of FIG. 1.

At block 504, the example diagnostic application circuitry 144 provides information (e.g., diagnostic information) from the diagnostic report to the example cloud circuitry 148 of FIGS. 1 and/or 3 as input to one or more machine learning models. For example, the example cloud interface circuitry 206 provides, the network 142, the diagnostic information to the cloud circuitry 148 for use in executing the machine learning model(s).

At block 506, the example diagnostic application circuitry 144 identifies one or more components to test based on output (e.g., output data) from the machine learning model(s). For example, the cloud interface circuitry 206 obtains output data from the cloud circuitry 148, where the output data includes the component(s) to be tested and/or inspected for diagnosing the detected problem from the diagnostic information. In some examples, the component(s) include at least one of the devices and/or connectors of the subsystem 106 illustrated in FIG. 1 (e.g., the device 108, the controller 110, the first power source 116, the second power source 124, the output connection 112, the first wired connection 118, the first grounded connection 120, the second wired connection 126, and/or the second grounded connection 128). In some examples, the cloud interface circuitry 206 identifies, based on the output data, probabilities associated with the component(s), where each of the probabilities identifies a likelihood that a corresponding one of the components is a source of the detected problem.

At block 508, the example diagnostic application circuitry 144 selects the component(s) to test. For example, the example instruction generation circuitry 204 of FIG. 3 selects one of the components (e.g., a first component) based on the probabilities. In some examples, the instruction generation circuitry 204 selects the component corresponding to a first probability (e.g., a highest one of the probabilities), such that the selected component is likely to be a source of the detected problem.

At block 510, the example diagnostic application circuitry 144 causes one or more controllers (e.g., the example controller 110 of FIG. 1) to switch to a diagnostic mode. For example, the example vehicle interface circuitry 202 directs the vehicle control circuitry 132 to cause the controller 110 corresponding to the selected component to switch to a diagnostic mode, in which the controller 110 can send one or more query signals to the selected component for testing a response thereof.

At block 512, the example diagnostic application circuitry 144 generates instructions and/or a map for performing a test on the selected component. For example, the instruction generation circuitry 204 generates the instructions to instruct an operator of the vehicle 102 where to locate the selected component, how to access the selected component, a type of test to be performed, an expected response of the selected component, etc. In some examples, the instruction generation circuitry 204 generates and/or updates a map (e.g., an interactive map) to identify the location of the selected component on the vehicle 102 and/or the implement 104.

At block 514, the example diagnostic application circuitry 144 displays the instructions and/or the map to the operator of the vehicle 102. For example, the example user interface control circuitry 212 causes the instructions and/or the map to be displayed on the screen 150 of the mobile device 146 of FIG. 1. In some examples, the user interface control circuitry 212 obtains user input from the operator, where the user input includes the operator selecting one or more portions of the map, modifying a size and/or orientation of the map, zooming into and/or out of the map, varying a transparency of the portion(s), etc. In some examples, the user interface control circuitry 212 modifies the display of the map and/or the portion(s) of the map based on the user input.

At block 516, the example diagnostic application circuitry 144 monitors a response of the selected component. For example, the example response detection circuitry 208 of FIG. 2 monitors and/or detects the response of the selected component to the query signal(s) from the controller 110 and/or to the testing performed by the operator. Additionally or alternatively, the response detection circuitry 208 determines the response based on the user input to the mobile device 146, where the operator indicates, via the user, an observed response of the selected component and/or whether the observed response satisfies an expected response.

At block 518, the example diagnostic application circuitry 144 determines whether the selected component exhibits an expected response. For example, the response detection circuitry 208 detects the response of the selected component to the query signal(s) and/or to the testing performed by the operator, and compares the detected response to the expected response of the selected component. For example, the expected response can include a change in a feedback signal from the device 108 to the controller 110. In response to the response detection circuitry 208 determining that the selected component exhibits the expected response (e.g., block 518 returns a result of YES), control proceeds to block 522. Alternatively, in response to the response detection circuitry 208 determining that the selected component does not exhibit the expected response (e.g., block 518 returns a result of NO), control proceeds to block 520.

At block 520, the example diagnostic application circuitry 144 identifies the selected component as a source of the detected problem from the diagnostic report. For example, the response detection circuitry 208 determines, based on the selected component not exhibiting the expected response, that the selected component is an actual (e.g., true) source of the detected problem. In some examples, the response detection circuitry 208 causes storage of component identification information in association with the diagnostic information in the example diagnostic database 210 of FIG. 2, where the component identification information includes the location, model, type, and/or age of the selected component identified as a source of the detected problem.

At block 522, the example diagnostic application circuitry 144 determines whether there are one or more additional components to test. For example, the instruction generation circuitry 204 determines whether the diagnostic information includes one or more additional components that are a possible source of the detected problem. In some examples, the instruction generation circuitry 204 and/or the response detection circuitry 208 selects a second component to test corresponding to a second probability, where the second probability is less than the first probability of the first component. In other examples, the instruction generation circuitry 204 determines that there are no more additional components to test when the response detection circuitry 208 identifies at least one component that is a source of the detected problem. In response to the instruction generation circuitry 204 determining that there are one or more additional components to test (e.g., block 522 returns a result of YES), control returns to block 508. Alternatively, in response to the instruction generation circuitry 204 determining that there are no additional components to test (e.g., block 522 returns a result of NO), control proceeds to block 524.

At block 524, the example diagnostic application circuitry 144 provides one or more solutions to the detected problem based on the identified source(s) of the detected problem. For example, the user interface control circuitry 212 selects, from the diagnostic database 210, the solution(s) corresponding to the source(s) of the detected problem and/or the type of the detected problem, where the solution(s) can include repair and/or replacement of a selected component, repair and/or replacement of one or more connectors coupled to the selected component, maintenance and/or cleaning of the selected component, etc. In some examples, the user interface control circuitry 212 causes the screen 150 of the mobile device 146 to display the solution(s) to the operator of the vehicle 102.

FIG. 6 is a flowchart representative of example machine readable instructions and/or example operations 600 that may be executed and/or instantiated by processor circuitry (e.g., the example cloud circuitry 148 of FIGS. 1 and/or 3) to generate and/or train one or more machine learning models for diagnosing a problem of the vehicle 102 of FIG. 1. The machine readable instructions and/or operations 600 of FIG. 6 begin at block 602, at which the example cloud circuitry 148 accesses historical data from one or more vehicle control systems. For example, the example data interface circuitry 302 of FIG. 3 accesses and/or otherwise obtains the historical data from the example model database 308 of FIG. 3. In some examples, the historical data includes crowdsourced data from the vehicle control system(s) of one or more other vehicles communicatively coupled to the cloud circuitry 148. For example, the historical data includes previously detected problems of the vehicle control system(s), diagnostic information associated with the previously detected problems, and/or known solutions to the previously detected problems.

At block 604, the example cloud circuitry 148 correlates the diagnostic information with the previously detected problems from the historical data. For example, the example model training circuitry 304 of FIG. 3 determines a correlation between the previously detected problems and one or more components that were identified in the diagnostic information to be a source and/or cause of the previously detected problems.

At block 606, the example cloud circuitry 148 trains the machine learning model(s) based on the correlation. For example, the model training circuitry 304 adjusts one or more parameters of the machine learning model(s) based on the correlation, such that the trained machine learning model(s) output possible sources (e.g., components) to test based on an input of diagnostic information associated with a detected problem. In some examples, the model training circuitry 304 causes storage of the trained machine learning model(s) in the model database 308.

At block 608, the example cloud circuitry 148 determines whether to perform additional training. For example, the model training circuitry 304 determines whether to perform additional training based on whether new data (e.g., new crowdsourced data, new historical data) is obtained at the data interface circuitry 302. In response to the model training circuitry 304 determining that additional training is to be performed (e.g., block 608 returns a result of YES), control returns to block 602. Alternatively, in response to the model training circuitry 304 determining that no additional training is to be performed (e.g., block 608 returns a result of NO), control ends.

FIG. 7 is a flowchart representative of example machine readable instructions and/or example operations 700 that may be executed and/or instantiated by processor circuitry (e.g., the example cloud circuitry 148 of FIGS. 1 and/or 3) to execute one or more machine learning models for diagnosing a problem of the vehicle 102 of FIG. 1. The machine readable instructions and/or operations 700 of FIG. 7 begin at block 702, at which the example cloud circuitry 148 obtains diagnostic information from the example diagnostic application circuitry 144 of FIGS. 1 and/or 2. For example, the example data interface circuitry 302 of FIG. 3 obtains the diagnostic information via the example network 142 of FIG. 1, where the diagnostic information is from a diagnostic report generated by the example vehicle control circuitry 132 of FIG. 1.

At block 704, the example cloud circuitry 148 retrieves the machine learning model(s) from the example model database 308 of FIG. 3. For example, the example model processing circuitry 306 of FIG. 3 retrieves the machine learning model(s) for predicting one or more possible sources of a detected problem identified in the diagnostic information.

At block 706, the example cloud circuitry 148 executes the machine learning model(s) based on the diagnostic information. For example, the model processing circuitry 306 provides the diagnostic information (e.g., information associated with the detected problem) as input to the machine learning model(s), and executes the machine learning model(s) to output one or more possible sources of the detected problem.

At block 708, the example cloud circuitry 148 provides the output to the diagnostic application circuitry 144. For example, the data interface circuitry 302 provides the output to the diagnostic application circuitry 144 via the network 142, where the diagnostic application circuitry 144 is to use the output for testing one or more components of the vehicle control circuitry 132. Additionally or alternatively, the data interface circuitry 302 causes storage of the output in the model database 308.

Figure 8:
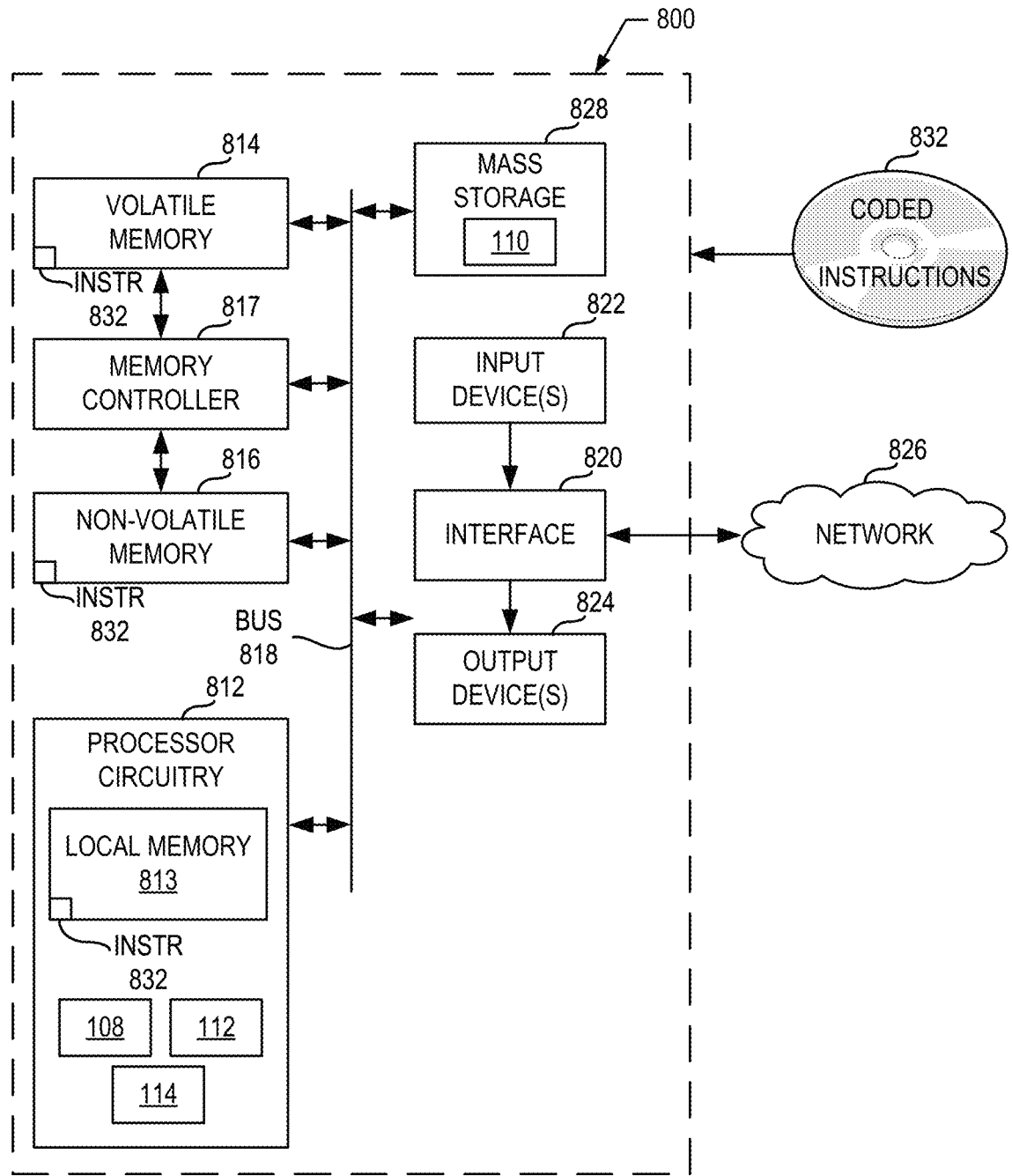
FIG. 8 is a block diagram of an example processing platform including processor circuitry structured to execute the example machine readable instructions of FIG. 4 to implement the example vehicle control circuitry of FIG. 1.

FIG. 8 is a block diagram of an example processor platform 800 structured to execute and/or instantiate the machine readable instructions and/or operations of FIG. 4 to implement the vehicle control circuitry 132 of FIG. 1. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example subsystem monitoring circuitry 134, the example report generation circuitry 138, the example vehicle database 136, and the example communication interface circuitry 140.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output devices 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 832, which may be implemented by the machine readable instructions of FIG. 4, may be stored in the mass storage device 828, in the volatile memory 814, in the non-volatile memory 816, and/or on a removable non-transitory computer readable storage medium such as a CD or DVD.

Figure 9:
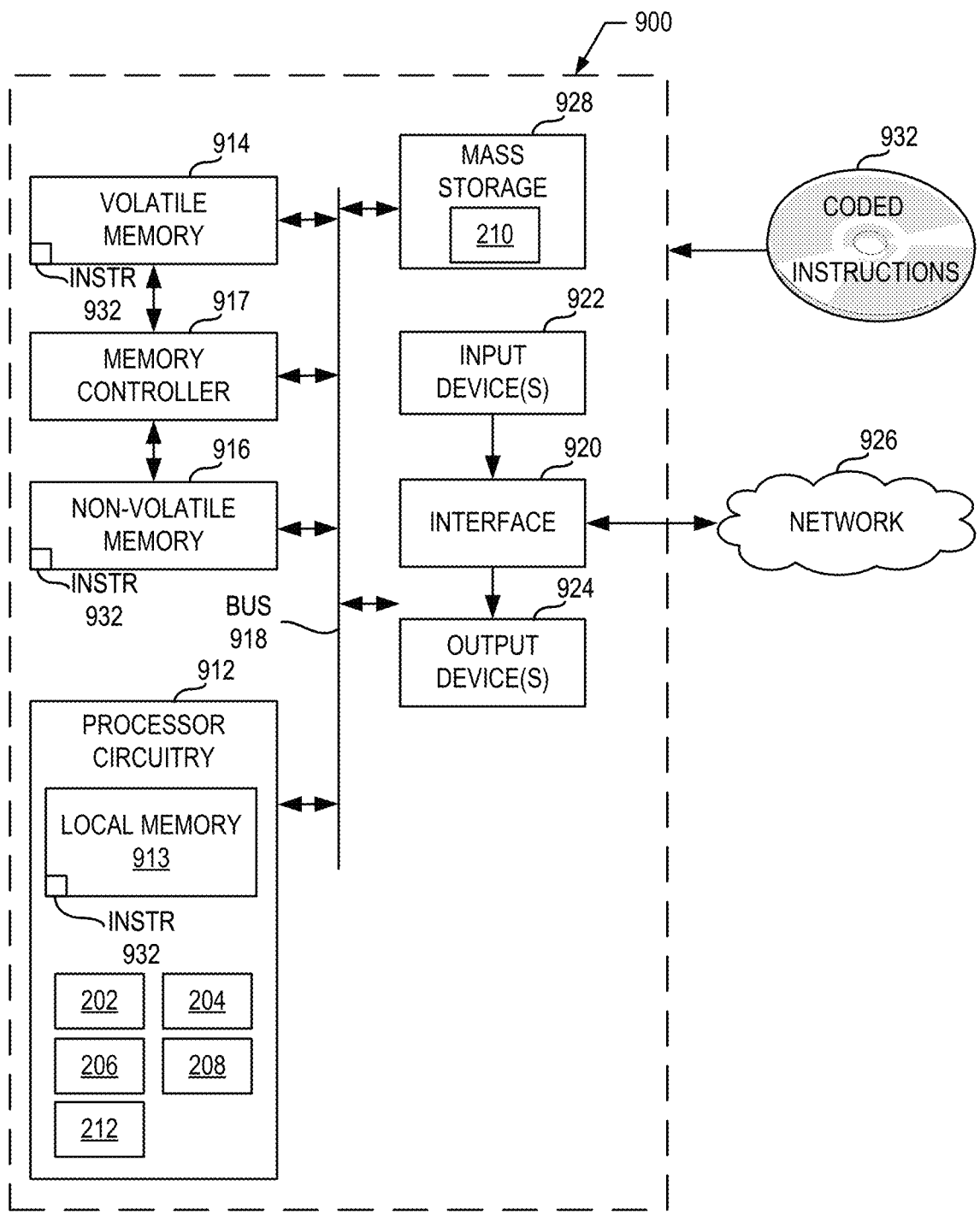
FIG. 9 is a block diagram of an example processing platform including processor circuitry structured to execute the example machine readable instructions of FIG. 5 to implement the example diagnostic application circuitry of FIG. 2.

FIG. 9 is a block diagram of an example processor platform 900 structured to execute and/or instantiate the machine readable instructions and/or operations of FIG. 5 to implement the diagnostic application circuitry 144 of FIG. 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the example vehicle interface circuitry 202, the example instruction generation circuitry 204, the example cloud interface circuitry 206, the example response detection circuitry 208, the example diagnostic database 210, and the example user interface control circuitry 212.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output devices 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 932, which may be implemented by the machine readable instructions of FIG. 5, may be stored in the mass storage device 928, in the volatile memory 914, in the non-volatile memory 916, and/or on a removable non-transitory computer readable storage medium such as a CD or DVD.

Figure 10:
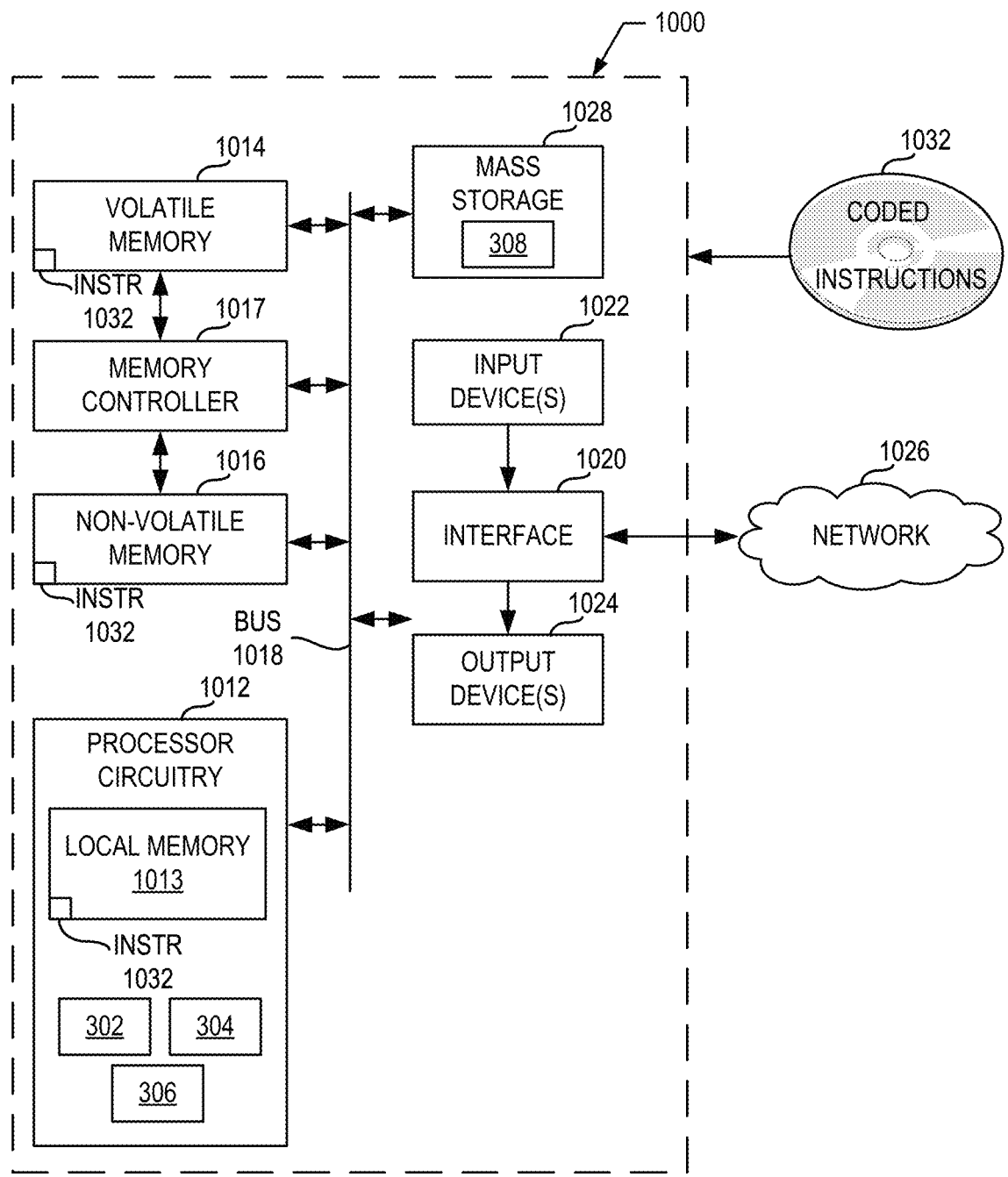
FIG. 10 is a block diagram of an example processing platform including processor circuitry structured to execute the example machine readable instructions of FIGS. 6 and/or 7 to implement the example cloud circuitry of FIG. 3.

FIG. 10 is a block diagram of an example processor platform 1000 structured to execute and/or instantiate the machine readable instructions and/or operations of FIGS. 6 and/or 7 to implement the cloud circuitry 148 of FIG. 3. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example data interface circuitry 302, the example model training circuitry 304, the example model processing circuitry 306, and the example model database 308.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine readable instructions of FIGS. 6 and/or 7, may be stored in the mass storage device 1028, in the volatile memory 1014, in the non-volatile memory 1016, and/or on a removable non-transitory computer readable storage medium such as a CD or DVD.

Figure 11:
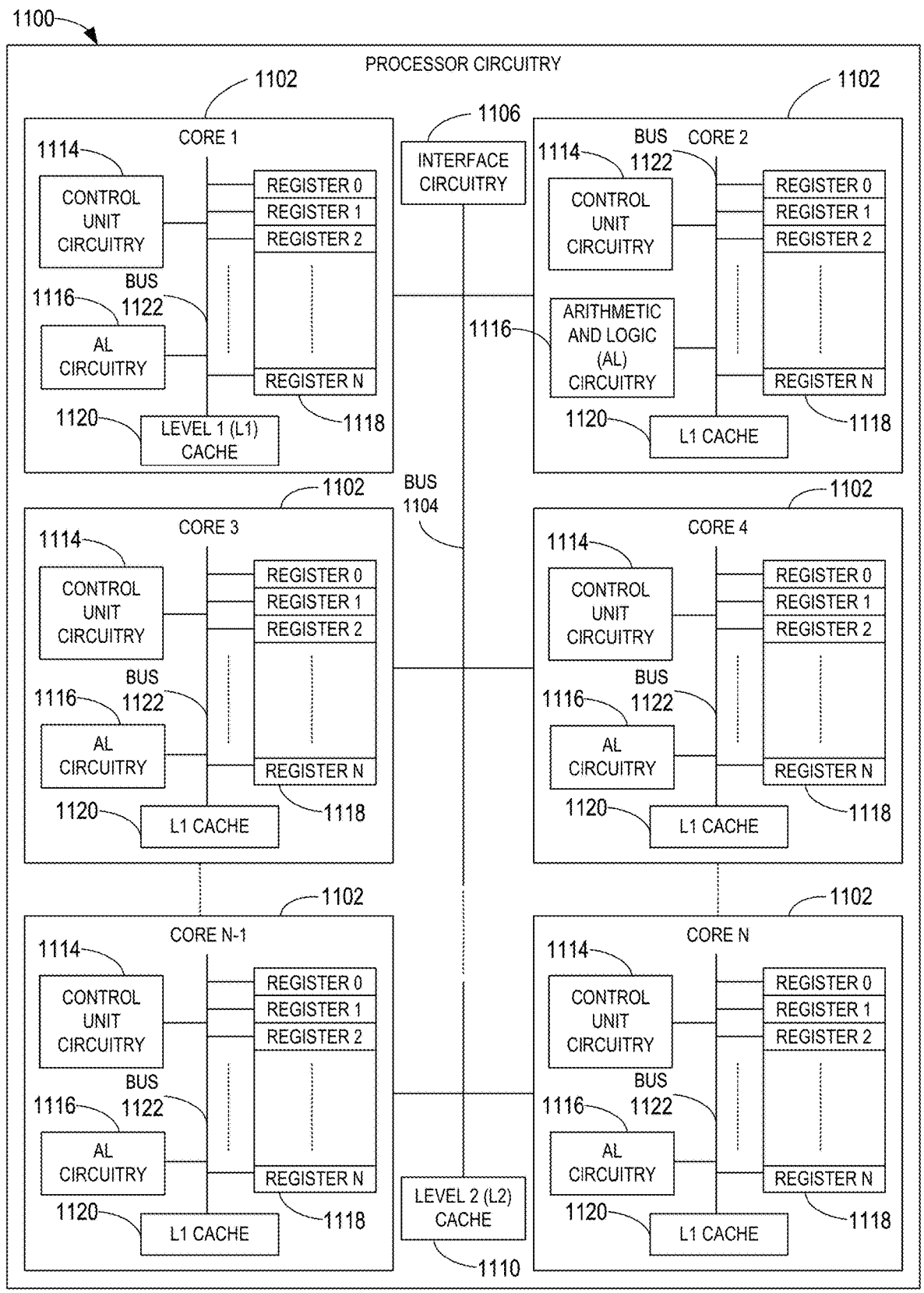
FIG. 11 is a block diagram of an example implementation of the processor circuitry of FIGS. 8, 9, and/or 10.

FIG. 11 is a block diagram of an example implementation of the processor circuitry 812 of FIG. 8, the processor circuitry 912 of FIG. 9, and/or the processor circuitry 1012 of FIG. 10. In this example, the processor circuitry 812 of FIG. 8, the processor circuitry 912 of FIG. 9, and/or the processor circuitry 1012 of FIG. 10 is implemented by a microprocessor 1100. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowcharts of FIGS. 4, 5, 6, and/or 7.

The cores 1102 may communicate by an example bus 1104. In some examples, the bus 1104 may implement a communication bus to effectuate communication associated with one(s) of the cores 1102. For example, the bus 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 814, 816 of FIG. 8, the main memory 914, 916 of FIG. 9, and/or the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The bus 1120 may implement at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
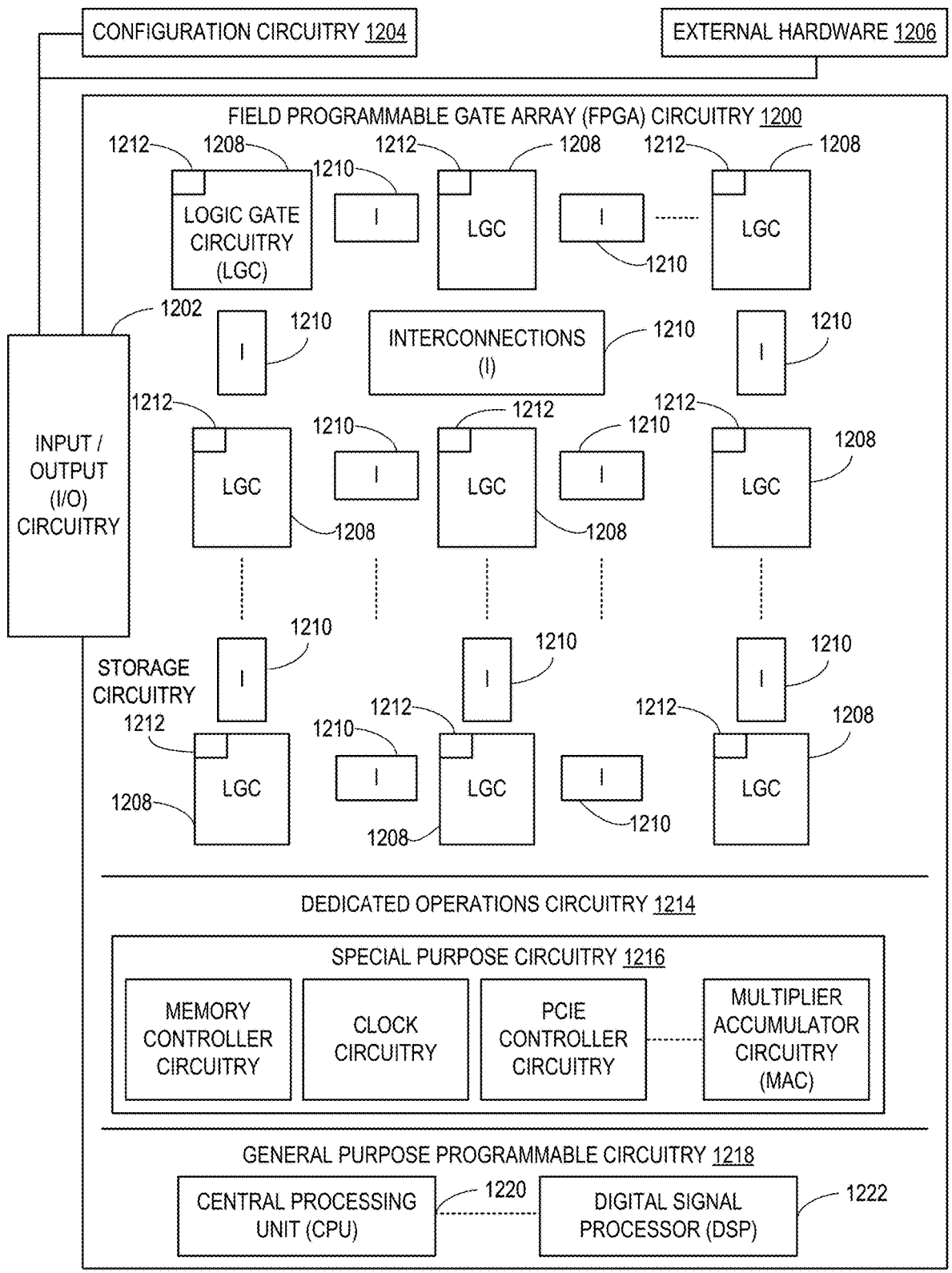
FIG. 12 is a block diagram of another example implementation of the processor circuitry of FIGS. 8, 9, and/or 10.

FIG. 12 is a block diagram of another example implementation of the processor circuitry 812 of FIG. 8, the processor circuitry 912 of FIG. 9, and/or the processor circuitry 1012 of FIG. 10. In this example, the processor circuitry 812 of FIG. 8, the processor circuitry 912 of FIG. 9, and/or the processor circuitry 1012 of FIG. 10 is implemented by FPGA circuitry 1200. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowcharts of FIGS. 4, 5, 6, and/or 7 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowcharts of FIGS. 4, 5, 6, and/or 7. In particular, the FPGA 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowcharts of FIGS. 4, 5, 6, and/or 7. As such, the FPGA circuitry 1200 may be structured to effectively instantiate some or all of the machine readable instructions of the flowcharts of FIGS. 4, 5, 6, and/or 7 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIGS. 4, 5, 6, and/or 7 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware (e.g., external hardware circuitry) 1206. For example, the configuration circuitry 1204 may implement interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may implement the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and interconnections 1210 are configurable to instantiate one or more operations that may correspond to at least some of the machine readable instructions of FIGS. 4, 5, 6, and/or 7 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 812 of FIG. 8, the processor circuitry 912 of FIG. 9, and/or the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 812 of FIG. 8, the processor circuitry 912 of FIG. 9, and/or the processor circuitry 1012 of FIG. 10 may additionally be implemented by combining the example microprocessor 1100 of FIG. 11 and the example FPGA circuitry 1200 of FIG. 12. In some such hybrid examples, a first portion of the machine readable instructions represented by the flowcharts of FIGS. 4, 5, 6, and/or 7 may be executed by one or more of the cores 1102 of FIG. 11 and a second portion of the machine readable instructions represented by the flowcharts of FIGS. 4, 5, 6, and/or 7 may be executed by the FPGA circuitry 1200 of FIG. 12.

In some examples, the processor circuitry 812 of FIG. 8, the processor circuitry 912 of FIG. 9, and/or the processor circuitry 1012 of FIG. 10 may be in one or more packages. For example, the processor circuitry 1100 of FIG. 11 and/or the FPGA circuitry 1200 of FIG. 12 may be in one or more packages. In some examples, an XPU may be implemented by the processor circuitry 812 of FIG. 8, the processor circuitry 912 of FIG. 9, and/or the processor circuitry 1012 of FIG. 10, which may be in one or more packages. For example, the XPU may include a CPU in one package, a DSP in another package, a GPU in yet another package, and an FPGA in still yet another package.

Figure 13:
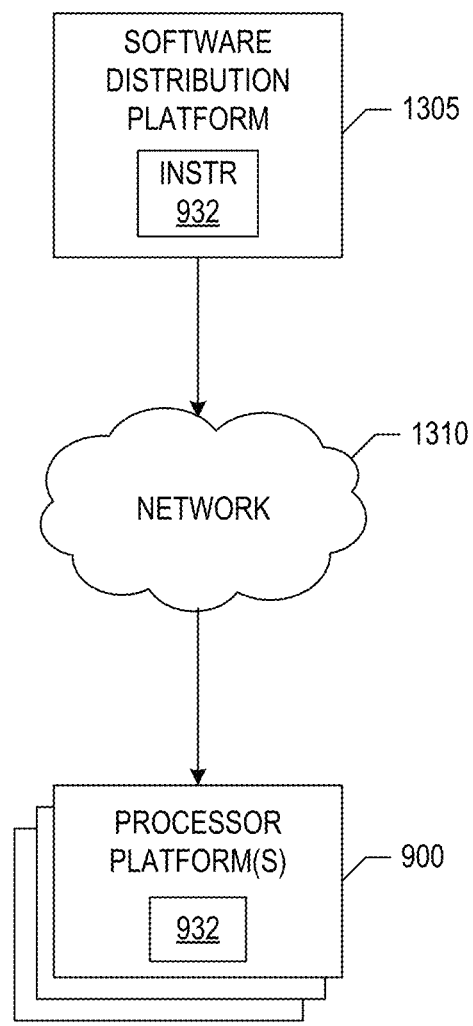
FIG. 13 is a block diagram of an example software distribution platform (e.g., one or more servers) to distribute software (e.g., software corresponding to the example machine readable instructions of FIG. 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1305 to distribute software such as the example machine readable instructions 932 of FIG. 9 to hardware devices owned and/or operated by third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine readable instructions 932, which may correspond to the example machine readable instructions 500 of FIG. 5, as described above. The one or more servers of the example software distribution platform 1305 are in communication with a network 1310, which may correspond to any one or more of the Internet and/or the example network 142 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1305. For example, the software, which may correspond to the example machine readable instructions 500 of FIG. 5, may be downloaded to the example processor platform 900, which is to execute the machine readable instructions 932 to implement the example diagnostic application circuitry 144 of FIGS. 1 and/or 2. In some example, one or more servers of the software distribution platform 1305 periodically offer, transmit, and/or force updates to the software (e.g., the example machine readable instructions 932 of FIG. 9) to ensure improvements, patches, updates, etc., are distributed and applied to the software at the end user devices.

From the foregoing, it will be appreciated that example systems, methods, apparatus, and articles of manufacture have been disclosed that obtain diagnostic information for a vehicle control system of a vehicle. The disclosed systems, methods, apparatus, and articles of manufacture use historical data to train machine learning models that, upon execution, identify one or more components to be tested and/or inspected by an operator of the vehicle. The disclosed systems, methods, apparatus, and articles of manufacture are implemented on a mobile device, thus enabling the operator to obtain instructions and/or a map of the vehicle when the one or more components are located far from a cab and/or a user interface of the vehicle. The disclosed systems, methods, apparatus, and articles of manufacture improve the efficiency of using a computing device by utilizing machine learning model(s) to identify, based on historical data, particular ones of the components to be tested and/or the type of testing to be performed, thus reducing a number of the components to be tested and/or time required for testing. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to obtain diagnostic information for a system are disclosed herein. Further examples and combinations thereof include the following:

Example 1 includes an apparatus to determine diagnostic information for a system, the apparatus comprising vehicle interface circuitry to obtain information corresponding to a detected problem of a vehicle, cloud interface circuitry to obtain, via a network communication, an output of a machine learning model executed based on the information, the output to indicate (a) a component associated with the detected problem, and (b) a probability associated with the component, instruction generation circuitry to generate instructions for performing a test on the component, and user interface control circuitry to cause the instructions to be displayed on a mobile device.

Example 2 includes the apparatus of example 1, wherein the component is a first component, further include response detection circuitry to detect a response of the first component to the test, in response to determining that the response does not satisfy an expected response of the first component, select the first component as a source of the detected problem, and in response to determining that the response satisfies the expected response, select, a second component based on the output.

Example 3 includes the apparatus of example 2, wherein the response detection circuitry is to detect the response based on at least one of user input to the mobile device or a query signal provided to the first component.

Example 4 includes the apparatus of example 2, wherein the probability is a first probability that the first component is the source of the detected problem, the response detection circuitry to select the second component based on a second probability that the second component is the source of the detected problem, the first probability greater than the second probability.

Example 5 includes the apparatus of example 1, wherein the instructions further include a map to indicate a location of the component on the vehicle.

Example 6 includes the apparatus of example 5, wherein the user interface control circuitry is to modify at least one of a size, orientation, or transparency of a portion of the map based on user input to the mobile device.

Example 7 includes the apparatus of example 1, wherein the machine learning model is trained based on historical data from one or more other vehicles, the historical data to include previously detected problems of the one or more other vehicles and solutions to the previously detected problems.

Example 8 includes a non-transitory computer readable medium comprising instructions that, when executed, cause processor circuitry to at least obtain information corresponding to a detected problem of a vehicle, obtain, via a network communication, an output of a machine learning model executed based on the information, the output to indicate (a) a component associated with the detected problem, and (b) a probability associated with the component, generate instructions for performing a test on the component, and cause the instructions to be displayed on a mobile device.

Example 9 includes the non-transitory computer readable medium of example 8, wherein the component is a first component, and wherein the instructions, when executed, further cause the processor circuitry to detect a response of the first component to the test, in response to determining that the response does not satisfy an expected response of the first component, select the first component as a source of the detected problem, and in response to determining that the response satisfies the expected response, select, a second component based on the output.

Example 10 includes the non-transitory computer readable medium of example 9, wherein the instructions, when executed, further cause the processor circuitry to detect the response based on at least one of user input to the mobile device or a query signal provided to the first component.

Example 11 includes the non-transitory computer readable medium of example 9, wherein the probability is a first probability that the first component is the source of the detected problem, and wherein the instructions, when executed, further cause the processor circuitry to select the second component based on a second probability that the second component is the source of the detected problem, the first probability greater than the second probability.

Example 12 includes the non-transitory computer readable medium of example 8, wherein the instructions further include a map to indicate a location of the component on the vehicle.

Example 13 includes the non-transitory computer readable medium of example 12, wherein the instructions, when executed, further cause the processor circuitry to modify at least one of a size, orientation, or transparency of a portion of the map based on user input to the mobile device.

Example 14 includes the non-transitory computer readable medium of example 8, wherein the machine learning model is trained based on historical data from one or more other vehicles, the historical data to include previously detected problems of the one or more other vehicles and solutions to the previously detected problems.

Example 15 includes an apparatus to determine diagnostic information for a system, the apparatus comprising means for interfacing with a vehicle to obtain information corresponding to a detected problem of the vehicle, means for interfacing with a cloud to obtain, via a network communication, an output of a machine learning model executed based on the information, the output to indicate (a) a component associated with the detected problem, and (b) a probability associated with the component, means for generating instructions to generate the instructions for performing a test on the component, and means for controlling a user interface to cause the instructions to be displayed on a mobile device.

Example 16 includes the apparatus of example 15, wherein the component is a first component, further include means for detecting to detect a response of the first component to the test, in response to determining that the response does not satisfy an expected response of the first component, select the first component as a source of the detected problem, and in response to determining that the response satisfies the expected response, select, a second component based on the output.

Example 17 includes the apparatus of example 16, wherein the means for detecting is to detect the response based on at least one of user input to the mobile device or a query signal provided to the first component.

Example 18 includes the apparatus of example 16, wherein the probability is a first probability that the first component is the source of the detected problem, the means for detecting to select the second component based on a second probability that the second component is the source of the detected problem, the first probability greater than the second probability.

Example 19 includes the apparatus of example 15, wherein the instructions further include a map to indicate a location of the component on the vehicle.

Example 20 includes the apparatus of example 19, wherein the means for controlling the user interface is to modify at least one of a size, orientation, or transparency of a portion of the map based on user input to the mobile device.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to determine diagnostic information for a system, the apparatus comprising:
    vehicle interface circuitry to obtain information corresponding to a detected problem of a vehicle;
    cloud interface circuitry to obtain, via a network communication, an output of a machine learning model executed based on the information, the output to indicate (a) a component associated with the detected problem, and (b) a probability associated with the component;
    instruction generation circuitry to generate instructions for a user to perform a test on the component;
    user interface control circuitry to cause the instructions to be displayed on a mobile device, the instructions to (a) instruct the user to perform the test by performing manual inspection of the component and (b) indicate an expected response of the component to the test; and
    response detection circuitry to:
        determine, after performance of the test and based on user input to the mobile device, whether the component satisfies the expected response as a result of the test; and
        identify a source of the detected problem based on whether the component satisfies the expected response.

2. The apparatus of claim 1, wherein the component is a first component, the response detection circuitry to:
    detect a response of the first component to the test;
    in response to determining that the response does not satisfy the expected response, select the first component as the source of the detected problem; and
    in response to determining that the response satisfies the expected response, select a second component based on the output.

3. The apparatus of claim 2, wherein the response detection circuitry is to detect the response based on at least one of the user input to the mobile device or a query signal provided to the first component.

4. The apparatus of claim 2, wherein the probability is a first probability that the first component is the source of the detected problem, the response detection circuitry to select the second component based on a second probability that the second component is the source of the detected problem, the first probability greater than the second probability.

5. The apparatus of claim 1, wherein the instructions further include a map to indicate a location of the component on the vehicle.

6. The apparatus of claim 5, wherein the user interface control circuitry is to modify at least one of a size, orientation, or transparency of a portion of the map based on the user input to the mobile device.

7. The apparatus of claim 1, wherein the machine learning model is trained based on historical data from one or more other vehicles, the historical data to include previously detected problems of the one or more other vehicles and solutions to the previously detected problems.

8. The apparatus of claim 1, wherein the manual inspection of the component includes the user manually moving the component.

9. A non-transitory computer readable medium comprising machine-readable instructions that, when executed, cause processor circuitry to at least:
obtain information corresponding to a detected problem of a vehicle;
obtain, via a network communication, an output of a machine learning model executed based on the information, the output to indicate (a) a component associated with the detected problem, and (b) a probability associated with the component;
generate instructions for a user to perform a test on the component;
cause the instructions to be displayed on a mobile device, the instructions to (a) instruct the user to perform the test by performing manual inspection of the component and (b) indicate an expected response of the component to the test;
determine, after performance of the test and based on user input to the mobile device, whether the component satisfies the expected response as a result of the test; and
identify a source of the detected problem based on whether the component satisfies the expected response.

10. The non-transitory computer readable medium of claim 9, wherein the component is a first component, and wherein the machine-readable instructions, when executed, further cause the processor circuitry to:
detect a response of the first component to the test;
in response to determining that the response does not satisfy the expected response, select the first component as the source of the detected problem; and
in response to determining that the response satisfies the expected response, select a second component based on the output.

11. The non-transitory computer readable medium of claim 10, wherein the machine-readable instructions, when executed, further cause the processor circuitry to detect the response based on at least one of the user input to the mobile device or a query signal provided to the first component.

12. The non-transitory computer readable medium of claim 10, wherein the probability is a first probability that the first component is the source of the detected problem, and wherein the machine-readable instructions, when executed, further cause the processor circuitry to select the second component based on a second probability that the second component is the source of the detected problem, the first probability greater than the second probability.

13. The non-transitory computer readable medium of claim 9, wherein the instructions further include a map to indicate a location of the component on the vehicle.

14. The non-transitory computer readable medium of claim 13, wherein the machine-readable instructions, when executed, further cause the processor circuitry to modify at least one of a size, orientation, or transparency of a portion of the map based on the user input to the mobile device.

15. The non-transitory computer readable medium of claim 8, wherein the machine learning model is trained based on historical data from one or more other vehicles, the historical data to include previously detected problems of the one or more other vehicles and solutions to the previously detected problems.

16. An apparatus to determine diagnostic information for a system, the apparatus comprising:
means for interfacing with a vehicle to obtain information corresponding to a detected problem of the vehicle;
means for interfacing with a cloud to obtain, via a network communication, an output of a machine learning model executed based on the information, the output to indicate (a) a component associated with the detected problem, and (b) a probability associated with the component;
means for generating instructions to generate the instructions for a user to perform a test on the component; and
means for controlling a user interface to cause the instructions to be displayed on a mobile device, the instructions to (a) instruct the user to perform the test by performing manual inspection of the component and (b) indicate an expected response of the component to the test; and
means for detecting to:
determine, after performance of the test and based on user input to the mobile device, whether the component satisfies the expected response as a result of the test; and
identify a source of the detected problem based on whether the component satisfies the expected response.

17. The apparatus of claim 16, wherein the component is a first component, the means for detecting to:
detect a response of the first component to the test;
in response to determining that the response does not satisfy the expected response, select the first component as the source of the detected problem; and
in response to determining that the response satisfies the expected response, select a second component based on the output.

18. The apparatus of claim 17, wherein the means for detecting is to detect the response based on at least one of the user input to the mobile device or a query signal provided to the first component.

19. The apparatus of claim 17, wherein the probability is a first probability that the first component is the source of the detected problem, the means for detecting to select the second component based on a second probability that the second component is the source of the detected problem, the first probability greater than the second probability.

20. The apparatus of claim 16, wherein the instructions further include a map to indicate a location of the component on the vehicle.

21. The apparatus of claim 20, wherein the means for controlling the user interface is to modify at least one of a size, orientation, or transparency of a portion of the map based on the user input to the mobile device.

* * * * *